(12) United States Patent
Shimamune et al.

(10) Patent No.: US 7,538,044 B2
(45) Date of Patent: May 26, 2009

(54) PROCESS FOR PRODUCING HIGH-PURITY SILICON AND APPARATUS

(75) Inventors: Takayuki Shimamune, Tokyo (JP); Tadashi Yoshikawa, Kanagawa (JP); Hiroshi Fukuoka, Tokyo (JP); Nobuo Ishizawa, Tokyo (JP)

(73) Assignee: Kinotech Solar Energy Corporation, Kawasaki (JP)

( * ) Notice: Subject to any disclaimer, the term of this patent is extended or adjusted under 35 U.S.C. 154(b) by 413 days.

(21) Appl. No.: 10/527,801

(22) PCT Filed: Sep. 11, 2003

(86) PCT No.: PCT/JP03/11656

§ 371 (c)(1),
(2), (4) Date: Oct. 11, 2005

(87) PCT Pub. No.: WO2004/035472

PCT Pub. Date: Apr. 29, 2004

(65) Prior Publication Data

US 2006/0270199 A1 Nov. 30, 2006

(30) Foreign Application Priority Data

Sep. 12, 2002 (JP) ............................. 2002-305110
Dec. 27, 2002 (JP) ............................. 2002-383648
Mar. 19, 2003 (JP) ............................. 2003-117612

(51) Int. Cl.
*H01L 21/3141* (2006.01)

(52) U.S. Cl. .................... 438/764; 423/341; 423/348; 423/349; 423/491; 257/E21.318

(58) Field of Classification Search ................ 438/764; 423/341, 348, 349, 491
See application file for complete search history.

(56) References Cited

FOREIGN PATENT DOCUMENTS

| JP | 2003-95633 | 4/2003 |
|---|---|---|
| JP | 2003-242016 | 12/2003 |
| JP | 2003-342016 | 12/2003 |

OTHER PUBLICATIONS

D.A. Seifert, Pilot-Scale Development of the Zinc Reduction Process for Production of High-Purity Silicon, Aiche Simposium Series, 1982, No. 216, vol. 78, pp. 104-115.

*Primary Examiner*—Thao X Le
*Assistant Examiner*—Elias Ullah
(74) *Attorney, Agent, or Firm*—Young & Thompson

(57) ABSTRACT

When high purity silicon is produced through a gas-phase reaction between silicon tetra-chloride and zinc in a reaction furnace, the produce silicon is obtained as block or molten state. after the reaction in which the silicon is not in contact with air and reaction temperature is maintained at melting point of the silicon or less.

8 Claims, 9 Drawing Sheets

US 7,538,044 B2

PROCESS FOR PRODUCING HIGH-PURITY SILICON AND APPARATUS

TECHNICAL FIELD

This invention concerns the production process of high purity silicon and the apparatus of it, and in details, the production process of high purity silicon preferably used to solar battery with high reaction efficiency and with reduced minimum content of impurities and its apparatus.

BACKGROUND OF INVENTION

Mainly un-satisfied quality silicon for semiconductor use has been previously utilized as the silicon for the solar cells, in that case, problems for the supply of enough amount are remained to satisfy the big increasing of demand for solar cells. From these, so-called metal melting process, where the reaction between molten zinc and silicon tetra-chloride is performed, is known for the independent supply of silicon, but has the problems of products having powdery and complicated treatment, difficulty of impurity treatments and also the difficulty of casting, which will result high cost, so the process has not been utilized.

To dissolve the problems, silicon production process by gas phase zinc reducing process was proposed, but together with the silicon produce, about ten times of amount of zinc chloride ($ZnCl_2$) is co-produced and the disposal of it must be troublesome, so the commercial application of this process is very limited. Recently, as described in JP-A-11(1999)-92130, silicon production process by spraying silicon tetra-chloride to molten zinc and then formed zinc-chloride is electrolyzed to taking out zinc and chlorine, where formed chlorine is taking out as hydrochloric acid and used for production of silicon tetra-chloride, has been proposed. From the point of view of reuse of zinc chloride, the objective has been established, but actually produced silicon is mixture of molten zinc and silicon itself became fine powders, so formed silicon particle having big surface area, then purification became difficult, which was big problem.

Also processes using mono-silane, di-silane, or tri-chloro silan as raw material is known, in which the reaction rate is low and then both the energy consumption for producing silicon becomes big and recovery of co-existed hydrogen becomes big problems. Not limiting to hydrogen, disposing of co-produced chlorine and hydrochloric acid must be big problem also in this process, it is said to be difficult to reduce the cost, because hydrogen, which is rather expensive, must be used as the reducing materials.

Otherwise, to obtain single crystal silicon from poly-crystalline or powdered silicon obtained under these processes, it must have less problem when those silicon poly-crystalline materials having rather big particle size and relatively small surface area are used, because those materials have less absorption of impurities and oxygen, but in the case of silicon being fine powder and having high surface area, removal of surface absorbed materials is required before installing to the crystal growing processes though such silicone bulk is very pure because the absorbed materials must be caused of impurity, which gives complicated procedure and requires treatment of abolishes. Then the producing cost must become high. And according to the normal process, complicated processes of high temperature treatment being applied at first to produce silicon powder or fine crystalline, then cooling and then heating to melt are required, and which requires repeating heating/cooling, which gives also troublesome from the energy consumption.

Especially in these processes, each process is independent, so the workability is not bad but the process requiring big heat input/output is permissible for the manufacture of high value added ones of electronics devices, but for the use as solar cells, which must be the main usage, in which very low price and less energy consumption must be the main target, though very big amount of demand is expected. No technologies to satisfy these targets have been known.

As shown in the above, previous technologies are all mainly aimed silicon to grown as solid or crystalline, so the formed crystal blocks or powder is considered to be exposed in air where once formed silicon is re-refined according to the requirement, then re-melt or crystallization is performed, when in grown single crystals or grown poly-crystalline, where at least excess energy is required for re-melting. And when in producing silicon blocks or powders, as the materials, is premised to expose in air, block silicon is preferred to minimize the impurity absorption when in producing silicon raw material, then reducing process of silicon tetra-chloride by zinc, which is the simplest way of producing silicon, could not be applied in the commercial process, which has also big problem. Recently, some trials of direct taking out of molten silicon from the reaction furnace is performed, but several problems such as corrosion by co-product hydrochloric acid and reaction between furnace wall and silicon, which gives shortening of furnace life, due to high operation temperature, have been arisen.

And application of smaller reacting furnace and higher efficiency of reaction are desirable when in applying to the production of high purity silicon by gas phase reaction of silicon tetra-chloride and zinc of previous technology.

DISCLOSURE OF INVENTION

An object of this invention is to dissolve the problems given above by doing this to provide producing method of crystalline silicon and the apparatus thereof, which can give silicon with better crystalline together with improving the reaction efficiency.

Therefore, this invention is, at first, production method of crystalline silicon characterized by depositing silicon on seed crystals prior installed in reaction furnace keeping inner temperature being not lower than 910° C. for high purity poly crystalline silicon production by gas phase reaction of silicon tetra-chloride and zinc in said reaction furnace (hereinafter referred to as "first invention").

According to the first invention, following effects and bulk poly crystalline silicon can be obtained where especially superior from the point of view from energy consumption and environmental green.

(1) Silicon produced by the gas phase reaction of silicon tetra-chloride and zinc can be grown according to the habit of seed crystalline silicon, so polycrystalline silicon for the manufacture of solar cell, etc can be produced as bulk with high efficiency, and yield of silicon production must be very well.

(2) The energy consumption for silicon production can be kept to be very small.

(3) And, the produced silicon is poly crystalline with better crystalinity, stabilized, and also better energy efficiency, though almost amorphous when in produced by similar process to previous ones.

(4) The reaction product, zinc chloride, is given back to raw material of zinc by an electrolysis, and chlorine is also recycled, which is used as the raw material of silicon tetrachloride. And by doing this, almost no abandonment is co-produced.

At the second in this invention is the producing method of silicon characterized by proceeding gas phase reaction of silicon tetra-chlorate and zinc in a reaction melting furnace with keeping the inner-wall temperature being higher than melting temperature of silicon and the silicon melt produced in said reaction furnace to obtain molten silicon (hereinafter referred to as "second invention").

The following effects are obtained in the second invention and from these bulk polycrystalline silicon is said to obtain especially superior from the point of view of energy and environmental.

(1) As the inner wall temperature of the reaction melting furnace, where silicon is produced from silicon tetra-chloride and zinc by a gas phase reaction, is kept at higher temperature than the melting temperature of silicon, produced silicon which is thought to be formed as foggy status can be collected without attaching to the inner furnace of the reaction melting furnace. Therefore crystalline silicon for manufacturing solar cells can be obtained with higher efficiency as bulk and the yield of silicon becomes quite good.

(2) The energy consumption for production can be kept very low because of continuous process and crystallized just from the produced molten silicon, without solidification.

(3) And, the produced silicon status can be adjusted from normal poly crystalline to well crystallized near single crystal silicon, so the impurity content can be made very low.

(4) Zinc chloride, the product of the reaction is posse to be installed with keeping its status of liquid direct to the molten salt electrolysis back to the raw material of zinc, together with the chlorine, which is also recycled to use as the raw material of silicon tetrachloride and by doing this combination, almost no abandonment is expected.

At third of this invention is, production method of poly crystalline silicon characterized by producing high purity polycrystalline silicon by gas phase reaction of silicon tetra-chloride and zinc, where gas phase reaction being carried out at inner wall temperature of said reaction melting furnace being 907° C. to 1410° C. to deposit to be crystalline status then the temperature of melting furnace raising higher than 1410° C. to said crystalline silicon to melt and collected then the molten products being moved to the vessel out side of the furnace, and then cooling down to below 1410° C. to make solidification or crystallization (hereinafter referred to as "third invention").

Following effects were obtained in the third invention, and by doing this bulk polycrystalline silicon could be obtained with higher efficiency as bulk and the yield of silicon becomes quite good.

(1) The obtained silicon by previous silicon production process by gas phase reaction is powdered and adhered at the inner wall of the reaction furnace, so the separation of produced silicon from the wall is complicated and obvious impurity contamination was occurred together with the separation procedure, but in the third invention, produced silicon is made melt in the furnace and then taking out as the melt, then solidified and re-crystallized, so the high purity bulk silicon is obtainable. Therefore poly-crystalline silicon usable to the solar cell etc. is obtained with continuously and high efficiency, and so the high yield to silicon is established.

(2) The required labor hours for the production of silicon can be minimized, due to high product quality and capability of continuous operation, because of the refining and the produce of silicon being practically attained in a reaction furnace and the products being poly-crystalline silicon.

(3) Required energy for producing silicon can be minimized because the continuous operation is possible with keeping high temperature in a reaction system.

(4) Moreover, the produced silicon is well-crystallized polycrystalline, though former similar process gave almost amorphous, so the product is superior to it as the product stability and energy efficiency.

(5) Zinc chloride, one of the reaction product, is recovered as zinc, raw material, by electrolysis, and product chlorine is capable also to make recycle as the raw material of silicon tetra-chloride, where almost no abandonment is expected by doing this.

At fourth of this invention is the production method of high purity silicon characterized by forming silicon by reaction of silicon tetrachloride and zinc gas in a zinc-chloride atmosphere followed by putting said silicon to silicon reserving vessel with keeping the temperature being higher than the melting temperature of silicon, then cooling down to solidified (hereinafter referred to as "fourth invention").

Following effects are obtained in fourth invention by doing this, bulk poly-crystalline silicon could be obtained with higher efficiency as bulk and the yield of silicon becomes quite good.

(1) Silicon can be solidified without adhering to the inner wall of the reaction-melting furnace, similar to the second invention. Therefore silicon is obtained with very high yield, because crystalline silicon for manufacturing solar cell etc. can be produced with high efficiency as bulk.

(2) The product quality obtained is very high and continuous producing is possible, therefore the labor hour can be minimized.

(3) The required energy consumption for the produce of silicon can be minimized by continuous operation with keeping high temperature etc. in the reaction system.

(4) Moreover, the produced silicon is well-crystallized polycrystalline, though former similar process gave almost amorphous, so the product is superior to it for the product stability and energy efficiency.

(5) Zinc chloride, one of the products can be used as the atmospheric gas and almost no abandonment or exhaust is expected.

At the fifth of this invention is production method of high purity silicon characterized by the process of high purity silicon producing with silicon tetra-chloride as the raw material being proceeded having following processes of 1) Process of reaction of silicon tetrachloride and metal zinc in a reaction furnace with zinc chloride gas atmosphere, 2) Process of the produced metallic silicon being separated from gasses under molten state, 3) Process of partial zinc chloride gas being separated and cooled to be liquid, 4) Process of produce chlorine gas and molten zinc by electrolysis of liquid zinc chloride, 5) Process of heating and gasification of molten zinc and sending to the reaction furnace, 6) Process of produce low-purity silicon tetra-chloride by reacting low-purity silicon with chlorine gas generated by electrolysis, 7) Process of refining by distillation of low-purity silicon tetra-chloride, and then 8) Process of gasification of purified silicon tetra-chloride and sending it to reaction furnace (hereinafter referred to as "fifth invention").

Following effects are obtained in the fifth invention and production silicon was made possible by the reduction of silicon tetra-chloride with zinc, which was very simple but stated to be very difficult to attain high purity, though minimum energy consumption is expected.

1) High purity silicon capable to use as semi-conductor grade is easily produced.

2) Lower energy consumption in comparison with the previous zinc reducing silicon production process is capable.
3) Simplified production process of silicon is possible.
4) High purity production is possible with reducing the consumption of equipments including the reaction furnace though very high temperature operation.

The sixth of this invention is silicon producing system characterized by composed of reaction furnace to obtain solid or liquid silicon and zinc-chloride gas by reacting silicon tetra-chloride and zinc in gas phase, and silicon reserving portion situated at the below of the reaction furnace portion, where reaction gas inlet and zinc-chloride outlet and electric conductive refractory trap with heating mean to trap liquid or solid silicon where said trap is heated above melting temperature of silicon during or after of the supply of the reaction gas to let formed and trapped silicon to be molten and send said molten silicon to silicon reservoir are set up to the reaction furnace (hereinafter referred to as "sixth invention").

At the sixth invention, bulk silicon superior from the point of view of energy consumption and environmental green is obtained and moreover following effects are also obtained.

By the sixth invention, high purity block crystal silicon is obtained in the production with silicon tetra-chloride as the raw material, which was previously said to have difficulty in purification due to produced silicon being fine dendrite crystal. Also by this invention, as the reaction of silicon to silicon tetra-chloride is very fast and having one direction reaction, and silicon tetra-chloride+zinc→silicon+zinc-chloride gas phase reaction is also very fast and one-directional because silicon is eliminated from gas phase, the required system size is very small and the reaction speed is very fast with high productivity together with required energy for production is small of approximately 1/10 of conventional process by calculation which means very big energy saving can be attained. And by making the reaction temperature to be lower than melting temperature of silicon, possibility of reaction between produced silicon and inner-wall of reaction furnace is tremendously reduced and melting time of silicon in the furnace is minimized, so the service life of the reaction furnace equipments is tremendously elongated, which can result long term continuous operation of the system has been possible (hereinafter referred to as "seventh invention").

At the seventh of this invention is production method of silicon characterized by production of solid or liquid silicon and zinc-chloride gas by reaction of silicon tetra-chloride and zinc under gas phase, having refractory electric conductive trap with heating mean for trapping liquid or solid silicon produced in the reaction furnace to proceed the reaction and said trap temperature being raised above melting temperature of silicon during or after supply of reaction gas into said reaction furnace and produced silicon being collected and recovered, which we call Seventh invention here in below.

By the seventh invention, similar effects to the sixth invention are obtained.

The eighth of this invention is production method of high purity silicon characterized by production of high purity silicon from silicon tetra-chloride and zinc under gas phase reaction, where reaction temperature keeping lower than melting temperature of silicon without any contact with air during reaction and produced silicon being obtained as melt or block (hereinafter referred to as "eighth invention").

In the eighth invention, as the reaction temperature is lower than the melting temperature of silicon, no-solidification is occurred for the produced silicon and actually no adheres to the inner surface of the furnace and also no oxidation or no addition of impurity by contacting with air, so high purity silicon is obtained with high yield.

The above said and other objectives, formulations and superiorities of this invention must be clarified by the further following explanations.

BEST MODE FOR IMPLEMENTING INVENTION

First Invention

Figure 1:
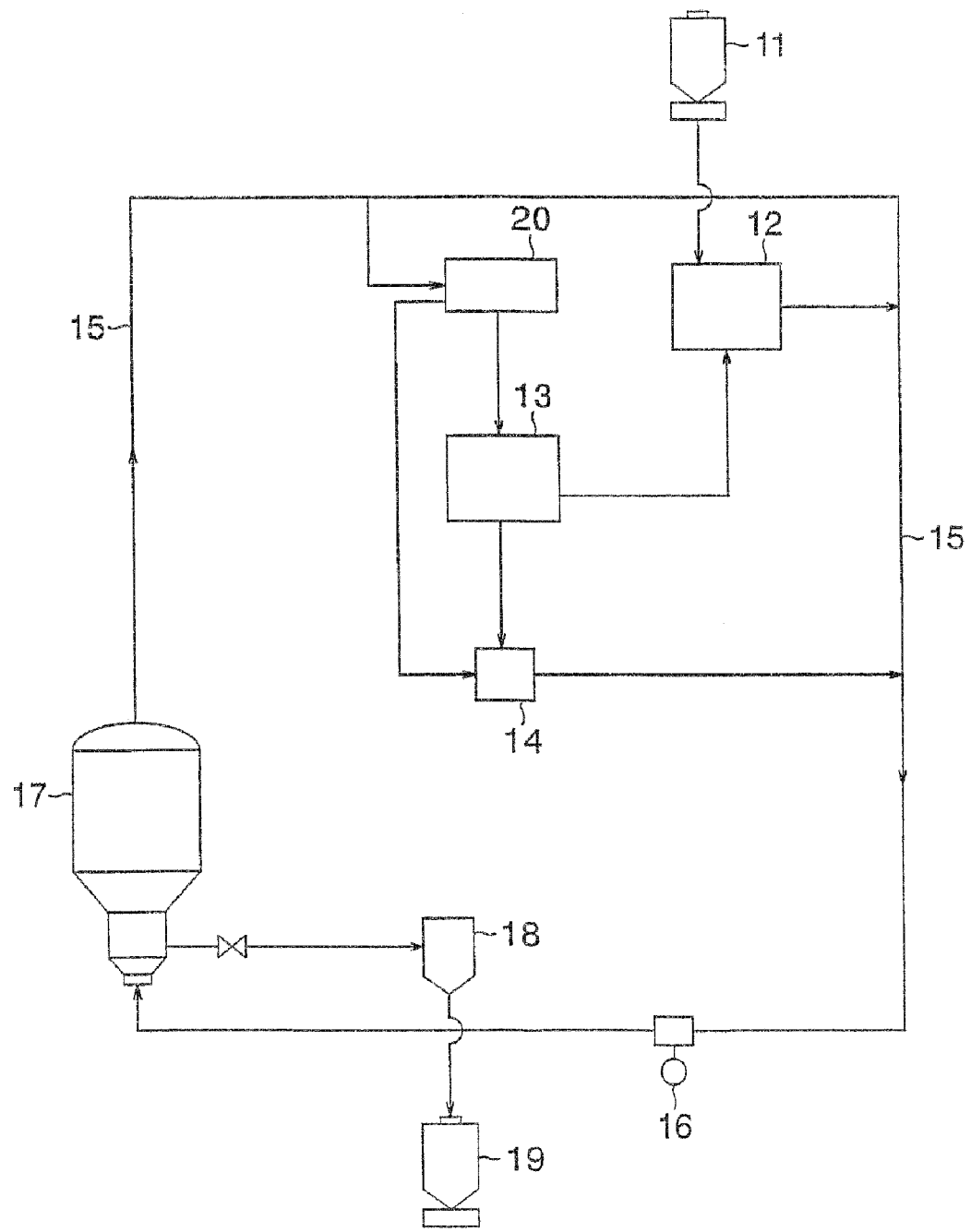
FIG. 1 shows a system flow showing an example of production method of first invention.

The feature of the first invention is reducing the facility cost and labor cost by applying continuous operation with smaller sized reaction furnace of fluidized bed type outer heating type rotary kiln or fixed bed type, when in obtaining poly crystalline high purity silicon, that is bulk high purity silicon from silicon tetrachloride and zinc under gas phase reaction, and then co-produced big amount of zinc chloride is recovered and re-cycled by electrolysis as zinc and chlorine in which zinc is as raw material for reducing and chlorine is as the raw material of chlorination of metals, thus by doing this, silicon production for the use of solar cells etc is established. And then, basically disposal to the outside of the system is eliminated and both cost saving and environmental green are attained.

First invention has the structure of described above and produced silicon by the gas phase reaction of silicon tetra-chloride and zinc and make to be deposited onto the seed silicon according to its crystalline habit, so well-crystallized bulk poly-crystalline silicon can be obtained. A portion of co-produced gas of zinc chloride is used circulation gas and this can be used for controlling the reaction speed and excess amount of it is recovered by separation as liquid and then it is recovered by electrolysis as raw the material, without actual abandonment to outside and raw material is effectively used with 100% efficiency, then poly-crystalline bulk silicon is obtained.

That is, thin layer formation by a normal CVD (Chemical Vapor Deposition) process can form thin layer reactant by forming product onto the substrate by the gas phase reaction, the crystallinity of the reactant is poor, where amorphous or even if it is crystalline, the crystallite size being up to 50 nm and very active and un-stabilized, so this cannot be used as the product silicon and re-treatment requires to make bulk crystal.

The first invention is also aimed to improve the process by using fluidized bed type outer heating type rotary kiln or fixed bed type. Well-crystallized bulk crystal is formed followed by the status of seed, which is prior put into the reaction furnace and controlled the reaction speed by remaining zinc chloride gas, reaction product, That is, controlling the temperature with higher than 907° C., the boiling temperature of zinc and lower than 1410° C. melting temperature of silicon with reaction gas to be silicon tetra-chloride, zinc and zinc chloride and putting well crystallized silicon seed in the furnace, bulk crystal of high crystallinity is obtained. The reasons have not yet been clarified but it is well known in the normal crystal growth gives also the well crystallized or same directional crystals are selectively obtained following to the well crystallized or preferred orientated seed crystal, therefore, the deposition of well crystallized one is selectively deposited and less crystallized and active fine particles must easily re-react back to silicon tetra-chloride. By the combination of these, well-crystallized silicon must be obtained. But when the temperature is too high, the selection of the materials made difficult, so the reaction temperature of not higher than 1200° C. is preferred.

In the first invention, silicon tetra-chloride and zinc gas is supplied with counter flow or parallel flow. When the temperature is higher than 910° C., both silicon tetra-chloride and zinc are vapor and gas. By the way, zinc chloride is also existed as gas as boiling temperature of it is 732° C., but the produced silicon is solid, so pure silicon is produced when the seed crystal temperature is kept higher than 910° C. But normally the product silicon is similar to one by CVD, where the status must be amorphous or even if crystallized, the crystallite size must be 50 nm to 100 nm and very active. To obtain higher crystalline status and stabilize, seed crystal, with particle state, sandy or thin plate poly-crystalline silicon is required to exist in the reaction furnace and then making to deposit produced silicon on them. By doing this, bulk crystal of silicon can be formed. In detail, the seed crystal temperature must be 900° C. to 1200° C., and desirable 950° C. to 1150° C. and in the case of fluidized bed system, silicon tetra-chloride and zinc gas are blown from lower to upper on to the seed with parallel flow is desirable. As the reaction speed between silicon tetra-chloride and zinc is very high, co-existence of zinc-chloride gas with proper controlling of pressure is done to optimize the reaction speed to obtain well-crystallized silicon.

That is, the reaction of silicon production is shown as
Reaction equation; $SiCl_4 + Zn \Leftrightarrow ZnCl_2 + Si\downarrow$ As this reaction is reversible, the reaction proceeds to right hand side, when in increase the relative concentration of raw materials $SiCl_4$ or $Zn$ that means the producing speed of silicon is increased. And when in increasing the $ZnCl_2$ concentration, reaction speed to produce silicon is reduced. In this reaction, silicon is solid and the produced silicon can be considered to eliminate from the reaction system. By increasing the pressure, the reaction is to reduce it, so the reaction speed of the objective reaction (to right hand side reaction) is becoming big, and vise versa. The pressure in the reaction furnace is desirable to pressurize at around 1 to 5 atm. The supplied gas can be stated as the theoretical ratio of the raw materials, but zinc concentration is desirable to be little bit more, which is different from the former technologies, from the treatment. That is the excess amount of zinc absorbs chlorine, possibly generated, and to prevent the decomposed chlorine to attack not well-crystallized portion of produced silicon as hydrochloric acid, and well-crystallized silicon layer can be obtained. But this invented process can of course be operated under excess of silicon tetra-chloride. The supplied gas and atmospheric gas temperature can be adjusted to stably existing for both, and around 1000° C. is recommended.

For the growth of the bulk crystalline, which is different from the thin layers, seed crystals made of single- or poly-crystalline pure silicon with particulate, sandy or thin plate like ones must be prior inserted to the reaction furnace where the produced silicon by the reaction is piled up to the seed, then the bulk crystals can be obtained. And in this case, good crystalline silicon can be obtained though under rather high rate of reaction in comparison with making thin layer crystals, so the similar temperature range of production to form thin layer available and the operation is recommended to proceed under pressurized status. The conditions are of course to be selected by the target crystals and operation conditions.

The reaction gases after thus reacted, are the mixture of zinc chloride and zinc and/or silicon tetra-chloride, and a portion of it is desirable to be taken out from the reaction furnace and decrease its temperature to lower than 732° C., the boiling temperature of zinc chloride, and desirably lower than around 650° C., and recovered as liquid. The remaining silicon tetra-chloride is recycled as the raw material gas and the zinc chloride sent to the electrolysis facilities to decompose to zinc and chlorine, then zinc is recycled as the raw material and chlorine is capable to use for the production of silicon tetra-chloride.

The electrolysis of this zinc chloride is capable to proceed after taking out as solid zinc chloride by cooling but taken out as liquid, zinc chloride is also to be directly electrolyzed by so-called molten salt electrolysis process. Thus obtained liquid zinc chloride is installed into the electrolytic cell having drain in its pot shaped bottom of zinc reservoir and electrolysis is performed. As chlorine gas is generated at the anode of the cell, the generated chlorine gas is collected to the top part of the cell and send it to the silicon tetra-chloride producing facilities which is described later, and zinc, the cathode product, collected at the bottom of the cell is suitably taken out through the drain and re-used as the raw material. By doing this, bulk polycrystalline silicon can be produced with almost no abandonment.

Also, by constructing a gas-solid separation vessel where circulating gas and produced silicon is separated each other at the top of the cell, fine particle silicon is separated and is been putting back to the reaction furnace, and thus returned silicon can be used as the seed crystal, so continuous operation becomes possible without putting the seed crystals into the reaction furnace, then the produced particulate silicon is taking out from the lower part of the reaction furnace discontinuously. No structural limitation in the gas-solid separating vessel is existed and the objective will be attained to have a vacant area of 1 to 5 times of reaction furnace and by doing this, the objective must be satisfied.

The materials of reaction furnace, adding gas circulating systems, and taking out portion of the products, which must keep clean the product silicon and durable against the high temperature corrosive gasses, is very important, so prior silicon coating by CVD process to reaction furnace and/or circulating gas and taking out facilities of product silicon are very effective to this objective.

Second Invention

In the second invention, Production process of higher purity silicon with less cost is attained by recycling of the raw materials and simplifying the process in the gas phase reaction of silicon tetra-chloride and zinc to produce high purity silicon, bulk high purity silicon.

The second invention is in addition to above said matters, (1) The process of gas phase reaction between silicon tetrachloride and zinc is proceeded and obtain molten silicon and zinc chloride gas in a reaction melting furnace with keeping temperature of inner part at 1200° C. to 1600° C. and inner wall temperature 1410° C. to 1600° C., then molten silicon is collected as liquid and then de-gas is performed in clearing furnace under lower pressure and then send it to the vessel such as crucible and cool gradually to crystallize, (2) Cyclone melting reaction furnace is used as the reaction melting furnace and molten silicon and zinc chloride are obtained to let gas phase reaction in it with keeping temperature of inner part at 1200° C. to 1600° C. and inner wall temperature 1410° C. to 1600° C., then homogenized by re-melting in a re-melting furnace, followed by moving the molten silicon to clearing furnace then de-gas is performed under lower pressure and then send to the vessel such as crucible and cool gradually to crystallize.

In this feature, a cyclone melting furnace is used and the reaction gas and reacted products are circulated in it to homogenize the reaction and mutual collision of produced foggy liquid is occurred to form liquid drop and be separated from the system and taken out. By applying this process together with making the atmospheric gas to be reacted product, zinc chloride, mixing of impurity materials can completely avoided and from the liquid silicon, bulk or according to the requirement, high purity silicon ingot can direct be produced by the crystallization.

In the second invention, reaction-melting furnace is used for the reaction of silicon tetrachloride and zinc, where the temperature of the reaction-melting furnace is 1200° C. to 1600° C. and it is required to keep that temperature. And not to adhere the product silicon to the inner-wall, the temperature of the inner-wall is kept to be 1410° C. to 1600° C., higher than the melting temperature of silicon and lower than no corrosion is occurred. To avoid invading impurities, the inner surface materials of the furnace must be inert to the reaction gasses.

The material for the furnace is not limited but silica (quartz) glass inner coating is especially desirable, which is inert and even if there occurred reaction, it does not become impurity because the same material as the product. Also magnesia coating is desirable, which has best workability and no reactivity. The temperature of the reaction-melting furnace is kept at higher than 1410° C. during the operation, but as the produced silicon particle is very fine in the reaction-melting furnace, molten state can be kept even at 1200 C, and grown to be liquid drop in a reaction-melting furnace. But during the growing process, partial crystallization might be occurred at such low temperature, re-melting is proceeded in re-melting furnace keeping at higher temperature than melting temperature of silicon. Then it moves to the next process. As the reacting gases are $SiCl_4$ and zinc, and if only this, as seen in the reaction equation, $SiCl_4+2Zn \rightarrow 2ZnCl_2$, big decrease of pressure is expected due to 2 molecules from 3 molecules in the gas phase, these reaction gasses are sent to the atmospheric gas to avoid the pressure change and to control the reaction velocity. The pressure of the reaction part is not limited, and must be determined by the reaction velocity and with considering the continuous operation and addition of the raw material, so normal air pressure is desirable. The atmosphere is desirable to be zinc chloride gas the same as the product and by applying this, the reaction is controlled. Depending on the reaction conditions, inert gas, Ar, is also available to partially add to the zinc chloride atmospheric gas, and to lessen the pressure change during the temperature change, the produced silicon and zinc chloride is sent to the re-melting furnace situated below and to make complete liquefying by keeping the temperature at higher than the melting temperature of silicon, then sent clearing furnace. When in the case of enough high temperature operation, the product can direct be sent to the clearing furnace, with disregarding the re-melting furnace, though molten silicon portion is kept at not lower than 1410° C., the melting temperature of silicon. In the clearing furnace, gas zone temperature existing zinc chloride must be little bit lower than that and partially gas is eliminated to make lower pressure and de-gas in liquid silicon is attained.

Silicon tetra-chloride and zinc, as the reaction gas, are supplied to the reaction furnace under gaseous state, directed to the furnace wall to make cyclone flow in the second invention. And to make the reaction homogenously, these raw materials are desirable to supply counter flow and to accelerate the reaction with random flow. Doing this, the reaction proceeds faster and foggy silicon gather at the center, when by mutual silicon collision, it goes to liquid drop and go down to the lower side by gravity. The supplying gas is not limited, but no temperature reduce in the reaction furnace by supplying it is required, and the supplying gasses must stably kept the gaseous states, silicon tetra-chloride must be higher than 100° C. and zinc must be higher than 950° C.

Zinc chloride or mixed gas of zinc chloride and argon, inert gas, can be used as the atmospheric gas. Zinc chloride is a reaction product of this silicon producing process and no harmful to this, and almost no influence to silicon, so it is the most preferable. That is the reaction of the silicon production is shown as prior said reaction equation, and this is reversible reaction, so when the relative concentration of raw materials of silicon tetra-chloride and zinc is increased, the reaction proceeds to right hand direction, where producing velocity of silicon is increased. Also, by increasing zinc chloride concentration in the reaction field, reaction velocity is lowered. In here, silicon can be considered to go out from the reaction system because it is liquid or solid. And by increase the operating pressure, objective reaction velocity is increased to mitigate, and reaction velocity is decreased with decreasing pressure. The pressure control is attained by zinc chloride by increasing reaction temperature. Considering these, normal air pressure or little bit higher pressure is desirable but must be adjusted by the operating conditions.

Thus the reaction is proceeded, the liquid silicon formed by the rotation of atmospheric gas is at first very fine liquid drop like mist, the size is grown to be liquid drop by mutual collision in gas flow and going down to lower side, then sent to re-melting furnace or clearing furnace situated at the below of the reaction furnace. On the same time, zinc chloride, atmospheric gas, is partially sent to the re-melting furnace of clearing furnace and it is eliminated from the reaction melting furnace, so the atmospheric gas is kept to be constant, which makes to continuous operation and continuous reaction.

Silicon is warmed up in the re-melting furnace to complete liquid and sent to the clearing furnace. When the reaction melting furnace temperature is kept to be higher than the melting temperature of silicon, and produced silicon is completely liquid, it can be sent directly to the clearing furnace. But normally, it must be put into the Re-melting furnace to increase the temperature enough for melting, to make homogenous melt and partial de-gas which is possibly contained in the melt is performed and the desirable to send to the clearing furnace. Clearing furnace and reaction melting portion and/or re-melting portion are sometime required to separate each other by valves. That is, although the reaction in the reaction-melting furnace is possible to complete continuous operation, batch process for the taking out of silicon is required, in such a case we might need to separate each other by valves.

The structure of the clearing furnace is given as the liquid container at lower part, and gas reservoir and gas exhaust system at upper part. It is desirable to have stirring mechanism work according to the requirement in the liquid portion. The gas exhaust system can be by pumping or can be by liquefaction of zinc chloride gas by cooling the out side of the exhaust gas pipe to lower temperature than melting one of zinc chloride. By making the gas to the liquid, the gas pressure in it becomes very strong minus pressure, so reaction gas, such as zinc chloride, containing in the molten silicon is eliminated. After the elimination of gas, molten silicon is sent to vessels such as crucible for solidification and crystallized. The conditions of the crystallization are not specially limited but cooling is proceeded from the lower side of the vessel with keeping the liquid, and more purification for obtained silicon is desirable by gradual cooling and crystallizing from lower to upper, where the impurity in the melt is forced to go to the upper side, which is similar to so called zone melting process, and the better performance can be obtained by growing the grain size though poly-crystalline but near to the single crystals. The controlling of the grain size is proceeded according to the requirement by controlling the cooling speed.

The liquid zinc chloride by cooling down can be used as the atmospheric gas, according to requirement, most part is take out to outside of the system and send to electrolysis system to produce zinc and chlorine. Zinc is re-used as reduction gas for the raw material and chlorine is capable to use to the formation of silicon tetra-chloride.

The electrolysis of zinc chloride is possibly proceed after zinc chloride being taken out taking from the system as solid by cooling, but liquid taken out is also electrolyzed by sending it as it is to the electrolysis cell, so called molten salt electrolysis. That is, thus obtained zinc chloride liquid is filled into the electrolysis cell where drain for taking out zinc at the bottom is given where pot portion of the bottom is made to be produced zinc reservoir. Chlorine gas generated at anode is collected to the upper portion and sent to the producing facilities of silicon tetrachloride, the after process, and the zinc reserved at the pot portion is taken out from the drain and used as the raw material according to the requirement.

By doing this, silicon crystal can be produced without almost no abandonment.

As shown already, importance for the materials used for not only reaction melting furnace, but re-melting furnace, clearing furnace and gas circulating process and taking out of products process is eliminating contamination to silicon together with durable against high temperature also durable against high temperature corrosive gases, and here special care is paid by using quartz glass to the portion contacting to liquids and gases and even if there occurred partial reaction, no impurities into the product. But other than it, no reacting materials with silicon melt, such as magnesium oxide etc is available as the material.

Third Invention

The third invention is a production method for the poly-crystalline high purity silicon, mainly for the polycrystalline high purity silicon for solar cells with minimum process from the silicon produced by the reaction to obtain bulk high purity silicon applying the gas phase reaction of silicon tetra-chloride and zinc.

The third invention covers the processes to stop the supply of the reaction gas or reduce the pressure in the reaction furnace other than the normal silicon producing process. After the reaction and crystallization, the impurity materials dissolved in the silicon melt can be removed as gas with reducing the pressure. And the said melt is also can be moved into the crucible etc, then gradually cooled and obtained bulk poly-crystalline silicon with any size without exposing to the outside air atmosphere.

In the third invention, the production of silicon is carried out by the reaction of silicon tetrachloride and zinc and silicon is obtained as the product. The characteristics of this process are (1) Having very fast reaction, (2) Easy to separate silicon from the raw material and co-reaction product zinc chloride due to only the product silicon is solid and others co-product zinc chloride and zinc and silicon tetra-chloride are gaseous at higher than 1000° C. though depending on temperature, (3) Co-product zinc chloride can be decomposed to zinc and chlorine by direct electrolysis where chlorine can be used for the silicon tetra-chloride production and zinc can be directly used as raw material, so almost the complete closed cycle is attained. Otherwise, there remain the problems as (1) Produced silicon is required to care for treatment because generally powder and/or needle crystals attached to the wall of the reaction furnace, (2) The surface of such silicon absorbs oxygen as impurity with contacting air, when taking out to air atmosphere, so removing and refining from such is required.

In the third invention, bulk crystal of high purity silicon can be obtained by applying the process melting in the furnace followed by taking out as melt then make solidification or crystallization.

The systems of the reaction furnace is not specially limited, any of fluidized bed, rotary kiln or fixed bed etc are available. In this case, the silicon is produced at the wall surface and it is melted in the furnace, so the inner wall of the furnace is desirable to be quartz glass or high-purity magnesia ceramics and especially quartz glass is desirable not to occur the reaction with molten silicon. The reaction gases, silicon tetra-chloride and zinc are sent to the furnace and produced silicon and zinc chloride. In this time, there is a possibility of giving too fast reaction when in supplying only silicon tetrachloride and zinc as supply gas, and these gases might be trapped in the product silicon, so it must be controlled by remaining the reaction product zinc chloride as the atmospheric gas.

The reaction equation of it is the same as described before and also the reaction equilibrium.

And to provide silicon seed crystal in the reaction furnace, bulk crystals of silicon having good crystalline and less impurity contained is also obtained as same as described above.

When the reaction gas composition is changed to give faster reaction, that is to reduce the zinc chloride concentration, the silicon formation speed becomes faster and the silicon becomes collection of small amorphous and/or fine crystals. Together with this the impurity in the produced silicon is increased. Otherwise, when the zinc chloride gas content is too high, formation of nuclear of silicon must be less and the crystal growth must be increased, so well grown dendrite crystal is obtained but the produced amount is reduced. As this is changed with operating temperature, so the proper conditions including temperature and gas composition is required. When the silicon seed is existed in the reaction furnace, crystal growth of the silicon following by the habit of the seed must be possible and the better dendrite is easy to obtained, so the contamination by impurity to silicon can be lessened.

Thus silicon is grown in the reaction furnace, supply of reaction gas must be stopped at the proper growth of it, the after cease the reaction, according to the requirement, the furnace temperature is increased to higher than 1410° C. that is higher than melting temperature of silicon. In this case, to get lower pressure, place cooler for the gas produced by reaction and reduce the temperature lower than 732° C., boiling temperature of zinc chloride, so zinc chloride together with un-reacted zinc is eliminated as liquid and the reducing pressure is attained without suction pump or blower.

One feature of the third invention is using zinc chloride, the reaction product, as the atmospheric gas, in which big difference must be occurred in comparison with the case using inert gas, such as argon. By doing this, produced or crystallized silicon is melted by heating and volatile non-reacted materials and impurities are eliminated from silicon as gas. And by doing this, generated silicon is actually refined by elimination of volatile materials contained under lower pressure, high purity silicon melt with higher than 6-nine is obtained, and is moved to the crucible etc. and then send to crystallizing furnace then kept it in. The temperature here must be of course higher than 1410° C., the melting temperature of silicon, high temperature must be more effective for refining, though increase vapor pressure and lose of silicon by vaporization is occurred to decrease silicon yield, so the highest temperature is desirable to be 1600° C. And when quarts glass is used as the furnace wall, damage of the wall is accelerated at higher than 1600° C., so lower than 1600° C. is also desirable.

Thus refined and molten silicon liquid is put into crucible or crystallization vessel and then give gradual cooling to crystalline. The crystallization conditions are not limited, but keeping the temperature of 1300° C. to 1400° C., little bit lower temperature than that of solidification of silicon in crucible or crystallization vessel and crystallization is desirably done. That is, when in fast cooling velocity, strain and cracking will occur together with smaller grain size, and not enough performance might be given, so care must be paid.

Otherwise, a feature of the third invention is molten salt electrolysis of reaction product of zinc chloride at the temperature of keeping liquids, where chlorine is generated at the anode, and zinc is produced at the cathode. The electrolysis of zinc chloride can be carried out after taken out zinc chloride and solidified, but also taken out zinc chloride as liquid in the process of de-pressurizing of reaction furnace and sent it, as it is, to the electrolytic cell and molten salt electrolysis is performed. The electrolysis is preceded in a cell with drain at the bottom, pot portion, which is used as the produced zinc reservoir is used and said zinc chloride is lead to it and electrolyzed. As chlorine gas is generated at the anode, it is collected at the upper point and then send to the process of silicon tetrachloride producing process and the zinc, cathode product and situated at the bottom is properly taken out through the drain, and re-used as the raw material. Thus silicon polycrystal is obtained with almost no abandonment.

The materials of the reaction furnace, the gas circulation process, and taken out process of the products must be important not to be contaminant to the product silicon, together with durable against corrosive gas and especially reaction furnace, in which silicon melt moves contacting with the furnace wall is also important to be inert against silicon melt, so quartz glass and high purity magnesium oxide, especially quarts glass is quite effective.

Fourth invention

The fourth invention is the production method of silicon with total process from the production of silicon to crystallization with rather easy process, and no intermediate taking out to air and required crystal or block is continuously produced and thus impurity contamination from the production facilities is minimum in the production process and the consumption is also minimum and durable and long life.

The feature of the forth invention contains following points except the one described before as (1) Production method of high purity single crystal silicon characterized by silicon tetrachloride gas and zinc gas being forced to react in zinc chloride atmosphere to produce silicon, where the said silicon is sent to silicon reservoir, keeping the temperature above silicon melting one then after de-gas contained in silicon, said silicon is sent to growing apparatus of single crystal, (2) Production method of high purity silicon characterized by forming silicon with proceeding the reaction of silicon tetrachloride gas and zinc gas in zinc chloride gas atmosphere, then said silicon is sent to reservoir keeping the temperature at above melting temperature of silicon and de-gas is performed followed by sending it to cooling vessel to make poly-crystalline silicon, (3) Production method of high purity silicon characterized by forming silicon with proceeding the reaction of silicon tetrachloride gas and zinc gas in zinc chloride gas atmosphere, then said silicon is sent to reservoir keeping the temperature at above melting temperature of silicon to de-gas is performed followed by semi-quenching to make poly-crystalline silicon.

In the fourth invention, the produced silicon in the silicon production process by silicon tetra-chloride is made to be liquid, where former problems such as produced silicon becomes to be fine powder with big surface area and big amount of surface absorption can be prevented and as liquid without taking out to air, which can also prevent containing impurities, and then eliminate possible impurities such as gas which is contained during the production under liquid then it is directly sent to crystallization process or high purity silicon block production process, and by doing this, required heat energy can make be minimum. And by doing this and by keeping the side wall temperature to be lower than melting temperature of silicon in the reaction facilities and keeping facilities of produced silicon, solid silicon is formed onto the wall surface, so the silicon melt does not contact with the walls, so contamination by impurities can be prevented to the reaction vessel and to the keeping reservoir is prevented and long term stable silicon production made to be possible.

For the production of impure silicon to high purity silicon, the raw metal silicon and chlorine is reacted to be silicon tetra-chloride and then removal of impurity, by distillation if required is performed, then it is sent to the reaction furnace and then reduced by zinc. The inner part of the reaction furnace is kept at 1000° C. to 1500° C. and zinc chloride is filled as the atmospheric gas. At the temperature of 1000° C. to 1500° C. zinc chloride, atmospheric gas, silicon tetrachloride and zinc, reducing agent are existed as gas state. Thus silicon tetrachloride is as gas and silicon is deposited by gas phase reaction under these temperatures. Thus in the reaction with reaction equation, $SiCl_4+Zn \rightarrow Si+ZnCl_2$. where only Si is liquid or solid and can be eliminated from the gas reaction system, the reaction is always directed to form silicon, and the reaction temperature is high, so the reaction velocity must be very fast. Adjustment of the reaction velocity is made by the zinc chloride partial pressure. Slightly higher pressure than air must be most proper, though not limited.

The ratio of silicon tetrachloride and zinc supplied is available under theoretical one. And so that the case, zinc must be also excess. That is, when silicon tetrachloride is excess, a portion of excess silicon tetrachloride react with product silicon and become silicon dichloride and the efficiency is reduced though slightly. When zinc is excess, though product does not be suffered by it but atmospheric gas analysis being done time to time and to adjust the gas inlet is desirable because the composition of atmospheric gas might change.

The zinc chloride gas as atmospheric gas is increasing with the proceed of reaction, the pressure is adjusted by partial elimination of it and eliminated zinc chloride gas is cooled to liquid and sent to the electrolysis cell then electrolyzed,

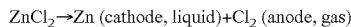

$ZnCl_2 \rightarrow Zn$ (cathode, liquid)+$Cl_2$ (anode, gas)

Then, Zn is heated and vaporized as it is and sent to reaction furnace as reducing agent and $Cl_2$ is reacted with raw material metal silicon to silicon tetra-chloride. The sub raw materials of Zn and $Cl_2$ is remained in the reaction systems and recycled, where the system can almost be closed one. To prevent contamination of product to decrease purity, and consumption of reaction furnace by the reaction between inner wall of the reaction furnace and the reaction materials by contacting, partial deposition of silicon can be performed with keeping the inner wall temperature of reaction furnace lower than the melting temperature of silicon and the silicon layer can be used as actual inner wall. In this case, it is desirable to the heating from the outer side being weak and reaction gas temperature itself being heated and circulated.

Silicon is thought to be at first produced as mist in the reaction furnace, then mutually collected gradually and falling down to the bottom of the reaction tower, and then it must be moved to silicon reservoir connected to the bottom of the reaction tower, kept at slightly higher temperature of silicon melting temperature and kept as liquid. The silicon reservoir used here is made of two compartments having the current path at the bottom and out put gate for silicon melt is given at the opposite side of reaction tower, where the low pressure argon of approximately $10^{-1}$ to $10^{-3}$ torr is applied as atmospheric gas. And according to the requirement, argon gas supply can be given from the bottom of the reservoir, collected silicon in the reaction tower is moved to the opposite side of the reaction tower thorough the melt current path and the gas contained in the melt is eliminated by bubbling of argon from the bottom of the reservoir and resulted to be high purity silicon melt. The temperature of the silicon reservoir is of course kept at higher than the melting temperature, and so that the case, the temperature of inner-wall is recommended to keep slightly lower than silicon melting temperature not to react melt silicon with the inner wall to keep the purity of silicon together with for the protection of inner wall as given similar to reaction vessel. It is desirable to heat the silicon melt itself by such as induction heating with slightly cooling the reservoir itself when in operation. The inner wall material both for reaction tower and the reservoir is not limited, but it is desirable to be silica glass, and by using this, almost no influence to the purity of silicon, even if any reactions were generated in between.

Thus obtained silicon is sent to the facilities of crystal growth and required high purity of 6-nine to 9-nine silicon is obtained, in which as an example, this can be used as the primary crucible of the double-crucible crystal growing system and the melt is continuously supplied it to grow single crystals by so called CZ process to obtain at least 8 to 10-nine silicon ingot as the segregation coefficient with zinc is very small as $1 \times 10^{-5}$.

Also, by cooling the melt in crucible or mold, poly-crystalline ingot can be obtained. And more, particle silicon is obtained by spreading over the silicon melt to the water cooled circular plate made of copper or platinum or silica glass in argon atmosphere (called centrifugal quenching process). The particle size of the product particulate silicon is desirable to 1 to 5 mm; it is easily adjusted by the rotating speed of the circular plate and by the outlet nozzle size of the silicon melt.

Fifth Invention

Fifth invention is aimed to supply the production method of obtaining high purity silicon melt continuously with minimum energy consumption with simplest process.

The fifth invention has the construction of formally described, and most primitive where directly single crystal or particulate crystalline silicon is obtained from actually as melt without taken out to the outside of the system after the production of silicon in high temperature gas phase reaction of silicon tetra-chloride by zinc reducing, which is normally said to be difficult to obtain high purity silicon.

The silicon production in the fifth invention is given as coarse silicon, the raw material being reacted with chlorine gas followed by refined with distillation, then it being sent to the atmospheric zinc chloride as gas and zinc reducing agent being also sent to it with gaseous status, then metal silicon and zinc chloride being formed. The reaction equation is the same as described before, where boiling temperature of zinc is 907° C., that of zinc chloride is 732° C. and silicon tetra-chloride 57.6° C., these three components can be kept as gas when the temperature is kept at higher than boiling temperature of zinc, also silicon is deposited as solid, because melting temperature of silicon is 1410° C. By applying this, silicon is taken out from the gas system as solid or liquid, the reaction proceeds to $ZnCl_2$ producing direction, without no reverse one.

Thus the reaction is one directional, and the high temperature reaction, reaction velocity is also very fast, which very small reaction vessel is available. When the reaction temperature exceeds to higher than 1350° C., the deposited silicon becomes liquid, as it is very fine. Thus produced silicon drop is heavier than atmospheric gas, it goes down to the lower part of the reaction furnace, then aggregated and becomes block when lower than the melting temperature, and when higher than melting temperature of it, it is collected to the reservoir situated in below as molten state. For this, usual furnace system can be used but cyclone-melting furnace, which can accelerate the collection and can minimize the collision between inner wall and the product, is more desirable and higher purity and this expects higher yield. By circulating the atmospheric gas together with reaction gasses with cyclone process, the aggregation is accelerated and together with that and falling down of those with becoming solid. By keeping the temperature of lower part of reaction furnace higher than melting temperature of silicon, product silicon can be taken out as melt without solidification. Otherwise, with increasing amount of zinc chloride, the reaction product and atmospheric gas can be taken out from the reaction system, then decrease the temperature to lower than the boiling temperature to make liquid and produced chlorine and zinc metal by electrolysis. Chlorine gas is from anode and metallic Zinc from cathode are obtained by the reaction equation $ZnCl_2 \rightarrow Zn+Cl_2$ (Theoretical decomposing voltage is 1.88V at 500° C.).

Thus obtained chlorine gas is reacted with coarse silicon and produce silicon tetra-chloride. As the melting temperature of zinc is 419° C., it is taken out as zinc melt by the electrolysis at above that temperature, then it is re-send to the reaction furnace by heating and gasification. Thus reaction medium, chlorine and zinc are recycled and in total, silicon is obtained as high purity silicon. As raw material, metal silicon or silicon scrap as a kind of silicon can be used and other than this, silica material (silicon oxide) can be used. In this case, the reaction is carried out with adding carbon powder or carbon monoxide as the reducing agent at above 400° C., and can be used in this process. But when silica materials are used as the raw material, it is desirable to use beforehand reduced and made to be metal silicon.

An example of using the raw material metallic silicon, where raw material silicon metal powder is reacted, is shown here in below.

As this reaction is very fast, the system is not limited, but fluidized bed system, where metal silicon powder and chlorine is flown in each counter flow, or chlorine gas is flown to the fixed bed silicon then taken out as silicon tetrachloride is applicable. Reaction temperature is desirable at 60° C. to 500° C. and by doing this, produced silicon chloride is separated as gas from silicon. In this case, no chlorine gas is considered exist when in existing Si because the reaction is very fast, but when in existing chlorine gas, it can be eliminated by decreasing the temperature lower than 50° C. where chlorine is existed as chlorine gas and silicon tetrachloride is as silicon tetrachloride liquid. Thus obtained liquid silicon tetra-chloride is refined by distillation. The condition of this is not specially defined if only silicon tetrachloride can be taken out as the gas, but under the temperature of 58° C. to 68° C. at normal pressure, only silicon tetra-chloride can be taken out. Thus obtained silicon tetra-chloride is heated with a heater and sent to the reaction furnace.

Otherwise, the structure of the reaction furnace is desirable to be cyclone-melting furnace and by using this silicon tetrachloride and zinc gas is reacted in circulating gas. By doing this, the contact between the reacting gas and the wall becomes minimum and invading the impurities and consumption of reaction furnace are minimized. Relatively stable zinc chloride gas is used as atmospheric gas in the reaction furnace. By doing this, as the reaction system is consist of only reaction materials and no other element can be contained, high purity can be kept and by adjusting the partial pressure, reaction velocity can also be adjusted. Normally, the pressure of the atmospheric gas is adjusted to be 1 to 5 atms, where zinc chloride gas, as atmospheric gas is more than 90%, and zinc gas amount is made to be slightly bigger than 0.1 to 10% excess against the theoretical values. By doing this, chlorine, high corrosive and re-decomposable chlorine can completely be eliminated.

The reaction temperature is desirable to higher than 1350° C., and by this, silicon, reaction product is in a very fine and liquid and easy to aggregate in the atmospheric gas and grown to be big particle, then collected to the lower part of the reaction furnace. At the lower part of the reaction furnace, by applying higher temperature than 1410° C., the melting temperature of silicon, is sent to reservoir with keeping liquid. This reaction furnace must be constructed with the materials without reaction with silicon, for example, metals such as iridium and tantalum, and refractory ceramics such as zirconium boride is used. Otherwise, silica glass, which is used to the single crystal growth of silicon is reacted with molten silicon under the reaction equation of $Si+SiO_2+2SiO$, and consumed but actually no other impurity metals are invaded, so it can also be used. For the stable operation of above said reactions, thin silicon layer can be formed on the surface of furnace wall by making the furnace wall temperature at slightly lower temperature of 1410° C., the melting temperature of silicon. By doing this, due to no contact of reaction gas top the furnace wall is prevented, longer service life is attained to the furnace wall and also contamination by impurities to the product silicon can be eliminated. That is, the temperature of reaction furnace itself is kept at lower than 1400° C. and zinc chloride, atmospheric gas, is kept to be high temperature to use as heating gas and must kept above 1350° C. or higher is desirable. By doing this, the product silicon can be obtained as liquid and no contamination by impurities is obtained because around the furnace wall is covered with silicon crystal, and high purity silicon. Thus the product silicon is aggregated and become big sized liquid drops and move to the lower side, and when the operation is carrying out with lower temperature, partial particles are obtained and then falling down. By slight raising of cyclone portion temperature or atmospheric gas temperature is slightly raised higher than 1410° C., the product is moved to the lower portion as liquid drops.

Thus, the silicon is moves to the reservoir as liquid and sometimes as solid, where the temperature in the reservoir is kept to be higher than melting temperature of silicon, and the thickness of silicon liquid must be minimum and possible contained atmospheric gas in liquid silicon must be eliminated. High purity argon gas can be gone through the liquid is possible and also it is possible to make lessen the pressure of atmospheric gas of the reservoir by cooling it to be liquid at the outlet of the reservoir. The material of the reservoir tank must be one not reacting with silicon and the temperature of reservoir tank main body can be kept by heating from out side but is desirable to keep slightly lower than melting temperature of silicon and heating of liquid silicon must be done by induction heating to keep higher than melting temperature, where reservoir is covered with solid silicon and the no direct contact of produced silicon to reservoir wall can be attained. In this case, silica glass etc can be used as the reservoir material. And valve metals such as tantalum, zirconium or niobium and their compounds such as oxides of tantalum oxide, niobium oxide or zirconium boride ceramics. Thus silicon kept in the reservoir can be crystallized according to the requirement.

Silicon purity in the reservoir is 6-nine to 8-nine and can be further purified by crystallizing process given in below. Here basically no taking it to the out side is done, so high purity can be kept, though taken out as solid in the previous process, and further purification is attained by the crystallization process.

When the reservoir combine with the single crystal growing facilities, the reservoir is possible to use as the outer crucible of the double crucible and simplification of crystal growing facilities is also possible. When in producing polycrystal, it can be crystallized by gradual cooling in crucible or grown under similar way of zone melting.

Also taking up with plate shape from the crucible is also possible. The block silicon is obtained by quenching with cooling facilities.

Zinc chloride gas taken out from reservoir or excess atmospheric gas is taken out and cooled to be liquid and sent to the electrolytic cell then chlorine gas and liquid zinc are obtained by electrolysis from it. Electrolysis is basically proceeded with molten salt type electrolysis at the desirable temperature of 460° C. to 550° C., and more desirable at 480° C. to 510° C., because the temperature is desirable to be higher than the melting of both zinc 419° C. and zinc chloride 283° C., thus zinc melt is obtained at the cathode and chlorine gas is obtained at anode. As described above, chlorine is used for the chlorination of metal silicon and zinc is collected and is collected and used to reduce silicon tetras-chloride in the reaction furnace. When in the electrolysis, only the molten zinc chloride is desirable to use as the electrolyte not to be contaminated with impurities, but according to the big electric resistance, addition of support electrolyte is also possible. Normally by adding caustic alkali, especially caustic potash is added to the electrolyte, then the electric resistance is tremendously reduced and lessen the electrolysis voltage and power consumption by electrolysis can be largely reduced.

But due to possibility to be contaminated with impurities by the addition, special care must be paid including the electrolysis cells.

As the raw material silicon metal purity is 98 to 99%, lack of chlorine will occur when in the chlorination of it, because some part is taken out with impurity. So chlorine must be added from out side to compensate, so chlorine can be added as chlorine gas but also addition of high purity zinc chloride is also possible. That is excess electrolysis is done by the addition of zinc chloride and excess zinc is taken out from the system and in addition, removal of the impurities in the system is also attained and long term continuous silicon production become possible.

Sixth and Seventh Invention

The sixth and seventh inventions have similar construction as the former one and high purity silicon block or melt can be obtained semi-continuously from silicon tetrachloride as the raw material.

The silicon producing facilities of the sixth invention is to meet silicon tetra-chloride and zinc in zinc chloride atmosphere, then solid or semi-molten silicon and zinc chloride are obtained, and thus obtained silicon is deposited by the trap situated in the reaction furnace and separated from atmospheric gas and reaction gasses, reaction product with very fine particles or melt product silicon is made to be caught by trap, which actually plays the roll of filter not to leak off from the system and deposited in the furnace.

And more, by doing this, after the completion of the proper amount of reaction, the reaction gasses are exhausted and trap portion containing filter is heated above 1410° C. melting temperature of silicon and silicon deposited in the inner-part is made falling down to the silicon reservoir situated beneath of the reaction furnace and Storing. Thus in the reservoir, silicon is stored as block and taken out time by time, or it is melted by heating and de-gassing of contained gas then re-solidified then taken out.

By doing this, block or liquid high purity silicon from silicon tetra-chloride as raw material is obtained, which is previously said to be difficult to obtain. That is, following were found in the silicon production from silicon tetra-chloride by the previous process, the produced silicon has fine particle, and so, when in taking out to the air, the silicon surface is oxidized or nitrified and the melting or other post treatment became difficult, and absorbed surface impurities caused to decrease the purity, the sixth invention was completed by finding out to establish the objective by no-exposure into the air up to the process to obtain solid or melt.

The silicon producing facilities of the sixth invention consists mainly of two portions, reaction furnace and silicon reservoir, which keeps the produced silicon in it. Reaction furnace is constructed with main furnace body and trap for produced silicon comprising of tantalum or molybdenum or their alloys which are refractory and electric conductive and actually no reaction with silicon even at high temperature equipped in the furnace, and inlet and out let of the reaction gasses and the drain of produced silicon. In addition to this, heating process for keeping the reaction temperature and trap heating mechanism to taking out produced silicon under liquid are included. And for the silicon reservoir, silicon melt inlet and outlet to taking out silicon as block and/or outlet for melt silicon, and according to the requirement, argon gas inlet for de-gas in silicon melt and heating mechanism are contained.

The reaction furnace is desirable to be vertical type and to be placed just above the reservoir, where liquid silicon in the reaction furnace falls down to the reservoir by gravity. The reaction furnace portion has heating mechanism as shown above. The reaction temperature must be lower than 1410° C., the melting temperature of silicon, and higher than 907° C., the boiling temperature of zinc to attain the gas phase reaction, where silicon tetra-chloride, zinc chloride and zinc are all gas, so the heating mechanism is existed. Also, produced silicon is piled up on to the furnace surface portion, and to move it to the reservoir, the wall temperature is required to be heated higher than the melting temperature of silicon. Also the trapping portion, as the deposited silicon is required to be completely dissolved at least the melting temperature of silicon is required and desirably by the treatment at higher temperature of about 100° C. of melting temperature of silicon to give low viscosity of molten silicon enough to send it to the silicon reservoir portion, so the trap temperature is desirable to be heated up to 1500° C. For this objective, it is desirable to generate heat in trap itself, so electric current is directly given to the trap itself or if the trap has three-dimensional structure, heat generation by the induction heating is desirable. By doing this, melting only silicon can be attained without increase the furnace temperature so high, and mixing of the impurity into silicon can be tremendously reduced. Thus the material of the trap is desirable to use tantalum or molybdenum or their based alloys, which do not actually reacted with silicon even at higher than its melting temperature, and have higher melting temperature, stable and electric conductive. For the furnace wall materials, it must be similar to this, and at least it is desirable not to react with silicon or reaction gasses, so other than above said tantalum and molybdenum, silica glass, which does not give contamination even when there occurred partial reaction, are desirable. This reaction furnace has gas inlets for raw material silicon tetra-chloride and zinc gas, and gas outlet for reacted gas, zinc chloride and/or gas inlet and outlet for the circulation of zinc chloride gas. Zinc chloride gas path can be used for above said raw material gas inlets by diluted gas for the reaction gasses. The materials of the trap is as said above where tantalum, tantalum base alloys, molybdenum or molybdenum base alloys is used, and the shape of it is not be limited, but at least high porosity structure is desirable to protect from escaping produced silicon during the taken out of zinc chloride gas, which must be actually worked as filter. No limitation is existed other than that, mesh materials such as expanded mesh and woven mesh, or foam or web made by combination of fine wire, etc. is used. These materials are set to surround the reaction portion of the reaction furnace and produced particle and/or liquid silicon formed by melting temperature decrease due to the fine particle effects are adhered to the surface of the trap. Tantalum and molybdenum do not react with silicon and even if they can react, basically it is solid-solid contact, no possibility to react each other is expected and no factor for contamination is expected. On the same time silicon is deposited also onto the furnace wall, also no reaction is expected and it must be stable when the wall is made of thus stable materials, such as silica glass or above described tantalum, molybdenum or these alloys.

Although the reaction is high temperature one, but not higher than the decomposition temperature of silicon tetra-chloride, normally no problem but to consider for protecting any possibilities of the reaction, 1 to 5% excess zinc is desirable even if there occurred self decomposition of it.

Thus deposited silicon is rapidly flown to the lower part by increase the temperature of trap to higher than the melting temperature of silicon and flown to the reservoir and kept in it. Also being increased the furnace wall temperature to higher than the melting temperature of silicon with short time, silicon is sent to the silicon reservoir without reaction with it. The heating up of the trap can be done by directly giving current to it if the structure is constructed with mesh or perforated plate, but when constructed with web or foam, which might be difficult to give directly current to them, so induction heating to the metallic parts having the power source at outside is desirably performed to make melting the silicon and it can be sent to the reservoir. The silicon adhered at the furnace wall self heated and made to be liquid and to send to the reservoir, when in operated with induction heating, but not, and in the case using the silica glass at the surface, liquefaction by the heating from outside is required. In this, reaction between silica glass furnace wall and the silicon is possibly occurred and formed SiO though very short time and it is exhausted as gas, almost no problem is expected from the specification, and even when contaminated, it is easily eliminated during the crystal growth.

The materials of the reservoir portion must be basically made of inert and non-reaction material against silicon, and it must be used as the treating furnace, so heating mechanism is required. That is stable operation at higher than the silicon melting temperature is required and it is desirable to operate at around 1500° C. The materials of the silicon reservoir portion is not especially limited but tantalum, molybdenum, tantalum base alloys and molybdenum base alloys, which do not react with silicon even at around 1500° C., and silica glass, which must not be impurity even when reacted are desirable to use. And according to the requirement, flow of argon gas from the bottom of the reservoir with heating the silicon higher than the melting temperature of silicon is possible to remove the gas component in the silicon for eliminating gas contained in the silicon. Other than above said metals, iridium, which has completely no reactivity with silicon and having high mechanical strength at high temperature, can be used as the nozzle material.

This process must be performed according to the requirement, because the contained gas is enough little when no such treatment is done, and crystallization process to polycrystalline or single crystal by CZ process can also easily eliminate the gasses component, so less problem for it.

Eighth Invention

The eighth invention is constructed with the above mentioned ones and is constructed by properly selecting the conditions of above mentioned from the first invention to the seventh invention and of reaction temperature to be lower than silicon melting temperature, no-contacting silicon with air during the reaction, and produced silicon being obtained as melt.

Examples of the silicon production methods regarding this invention will be explained by referring to the attached figures.

FIG. 1 shows the example of flow-chart of the production process of the first invention.

Coarse metal silicon material in the coarse metal silicon reservoir 11 is supplied to chlorination of metal silicon and silicon tetra-chloride producing facilities 12. On the same time, chlorine gas obtained in the electrolysis cell 13 of zinc chloride is also supplied to said chlorination of metal silicon and silicon tetra-chloride producing facilities 12, and the reaction is made to carry out to produce silicon tetra-chloride and then refined. Metal zinc produced in the said electrolysis cell 13 is supplied to the zinc distiller 14 and then the silicon tetra-chloride produced in said facilities 12 and metal zinc produced in said zinc distiller 14 are supplied to piping 15 and sent to the fluidized bed reaction furnace keeping it temperature lower than melting temperature of silicon by compressor 16 under mixture.

Metal silicon seed is prior set to the said fluidized bed reaction furnace 17 and said metal silicon produced by the reaction between silicon tetra-chloride and zinc is grown on the seed crystal and high purity silicon is obtained. The obtained metal silicon becomes molten state in said fluidized bed reaction furnace 17 and separated from the other gas component, and taken into the product tank 19 as high purity silicon through the product separation vessel 18.

Zinc chloride gas is remained in said fluidized bed reaction furnace 17 and the gas is circulated to the cooling apparatus 20 through the piping 15, then it is used as the raw material for zinc chloride electrolysis cell 13.

Other than above shown figure, high purity bulk polycrystalline silicon can be produced with high efficiency by using rotary kiln with outer heating mechanism as reaction furnace where particulate, sandy, and/or thin plate silicon as the seed crystal is inserted, under the similar process of the above said one.

Figure 2:
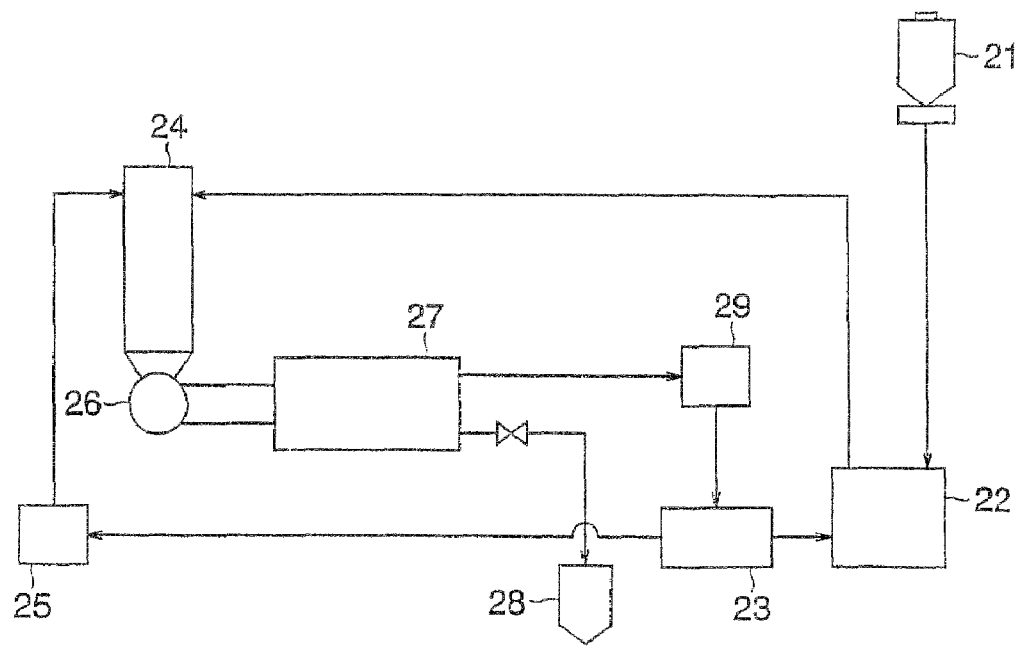
FIG. 2 shows a system flow showing an example of production method of second invention.

FIG. 2 shows the flowchart showing an example of the silicon production process of the second invention.

Coarse raw material metal silicon in the coarse metal silicon reservoir 21 is supplied to the silicon tetra-chloride synthesis tower 22 and is reacted with chlorine gas which is obtained in the zinc chloride electrolysis cell 23 and sent to the said synthesis tower, and silicon tetra-chloride is synthesized and thus obtained silicon tetra-chloride is supplied to the reaction melting furnace 24 through the piping.

Otherwise, metal zinc, produced in the said electrolysis cell 23 is gasified in the zinc distiller 25 and sent to said reaction melting furnace 24, it is reacted with silicon tetra-chloride and produce high purity silicon and zinc chloride. The obtained metal silicon becomes molten state in said reaction melting furnace 24 and then sent to the re-melting furnace 26 situated below it and the silicon becomes molten silicon and it is then sent to clearing furnace 27 after homogenized.

Zinc chloride gas, atmospheric gas, going into the clearing furnace 27 is made to be liquid by reducing the temperature, thus the pressure in the clearing furnace 27 is reduced and reaction gas and other impurities contained in the molten silicon is gasified and removed. After that, the molten silicon is sent to the silicon gradual cooling vessel 28, such as crucible, then the crystallization is preceded from lower side to upper and obtain big-grained poly-crystalline silicon where the finely contained impurities are collected at the top then it is separated. Zinc chloride gas in said clearing furnace 27 is cooled and the circulated to the said electrolysis cell of zinc chloride 23 as the raw material.

Other than the figure shown here, the clearing furnace can be separated and made independent from the re-melting furnace and zinc chloride gas in the re-melting furnace can also be directly sent to the cooling apparatus.

Figure 3:
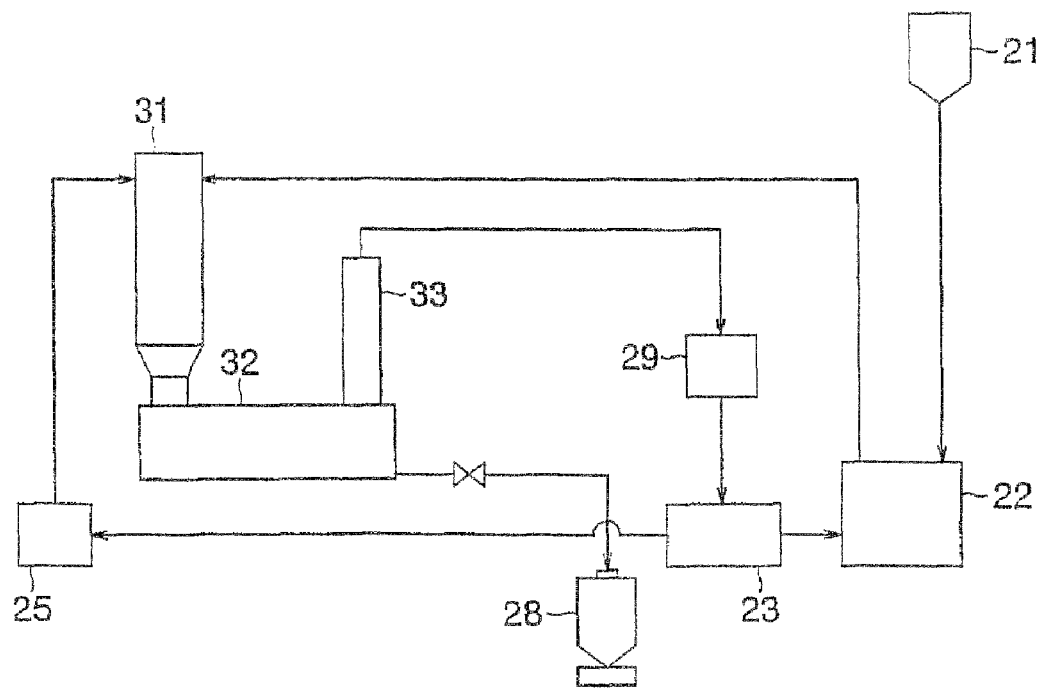
FIG. 3 shows a system flow showing an example of production method of third invention.

FIG. 3 shows the flowchart showing the example of production process of silicon in the third invention. The process of FIG. 3 is the improvement of FIG. 2 and the same apparatus with FIG. 2 is given, so the same sign and omitted the explanation to the same parts with the process of FIG. 2.

At the below of the reaction furnace 31 where high purity metal silicon and zinc chloride gas are produced by the supply of silicon tetra-chloride and zinc, silicon reservoir 32 where crystalline or silicon melt is kept is connected and the high purity metal silicon obtained in the reaction furnace 31 is crystallized or melted. The obtained metal silicon is reserved in the gradual cooling vessel 28 and zinc chloride gas is eliminated by mist separator 33 then obtained zinc chloride is cooled with cooling vessel 29 and then circulated to said electrolysis cell 23.

Figure 4:
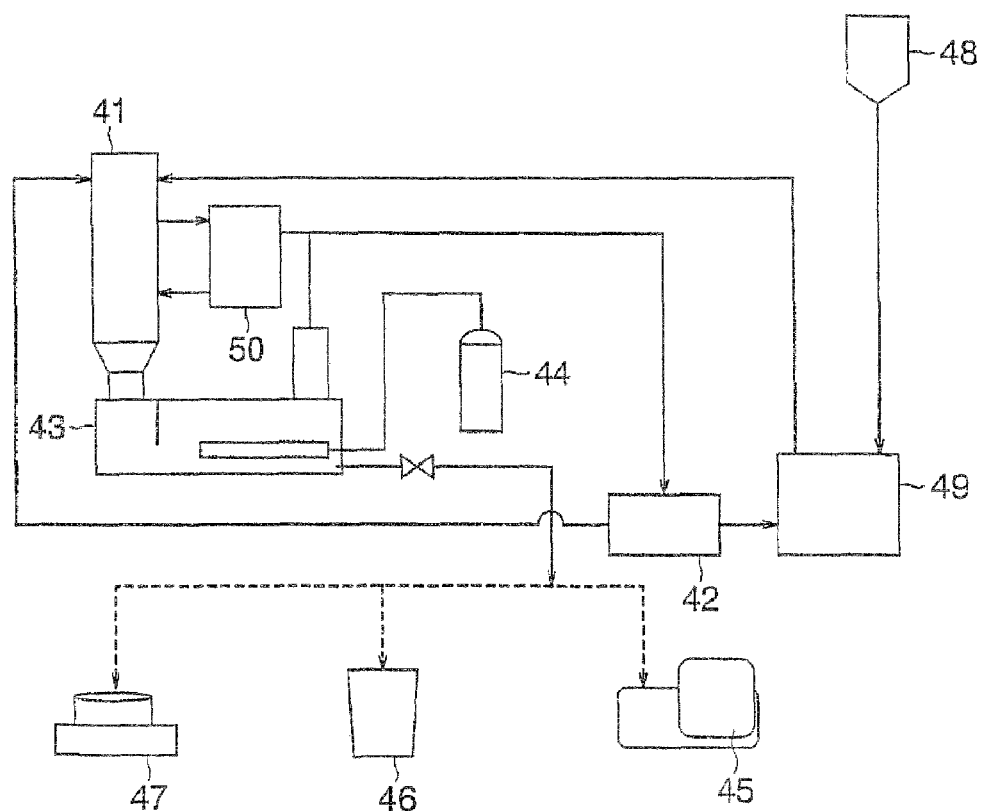
FIG. 4 shows a system flow showing an example of production method of forth invention.

FIG. 4 shows the flowchart showing an example of production process of the fourth invention.

Silicon chloride gas and zinc gas is supplied into the reaction tower 41 where applying zinc chloride as atmospheric gas. And produced zinc chloride gas is taken out from the reaction tower and cooled, then it is sent to the electrolysis cell 42, then the atmosphere, temperature and pressure are kept constant. Through the gas flow, the reaction gases are made to circulate and stirred to make easy to give reaction. Reaction gas and reaction product of silicon is collected to the center of the reaction tower by the circulating and stirring. By doing this, molten silicon or solid silicon having rather big specific gravity is moved to lower and collected to the reservoir. At the bottom of reaction tower 41, reservoir 43 having two compartments is situated. The operating temperature of reaction tower is 1000° C. to 1500° C. The silicon produced in the reaction tower 41 is at least partially melt or solid, and heavier than the atmospheric gas it is reserved in the reservoir 43 situated in the below as melt. Here, atmospheric gas enough lighter than the melt is almost separated and very little amount of it is contained in the melt. This melt is sent to the opposite side of reaction tower 41 through the lower part of the separator in the reservoir 43. The pressure of this portion is reduced to be $10^{-1}$ to $10^{-3}$ torr and remaining gas in the melt is removed by this low pressure and according to the requirement, de-gas can be carried out by supplying argon gas to the silicon melt through the de-gas mechanism 44 from the bottom of the reservoir. Thus purified silicon melt is sent to the CZ process, then single crystal silicon ingot 45 is produced by pulling up, or poly-crystalline silicon 46 is obtained by solidification in crucible, or particle silicon 47 by centrifugal quenching apparatus. As shown above, the reaction between the silicon and the wall of the reaction tower can perfectly be avoided by eliminating the direct contact in between by reducing the furnace wall temperature and by depositing silicon crystal onto the surface of the wall, for more safety, the materials of the reaction tower and the reservoir is recommended to use non contaminant materials to silicon, and the portion having direct contact to silicon is especially preferred to use silica glass or magnesia, and by doing this higher than 8-nine purity silicon in the case of single crystal can be easily obtained. The argon gas supplying nozzle can not be use these, so quartz glass no problem even in occurring reaction or stable and most durable metal of iridium can be used.

Similar results can be obtained by applying so called non continuous operation where one compartment reservoir, and not two compartments is used and when filled with silicon melt, supply of the reaction gas is stopped and de-gas or argon gas substitution is done.

In the Figure, 48 gives the coarse silicon reservoir, 49 gives synthesizing tower of silicon tetra-chloride and 50 is the facilities for heating and making circulating zinc chloride gas in between reaction tower 41.

Figure 5:
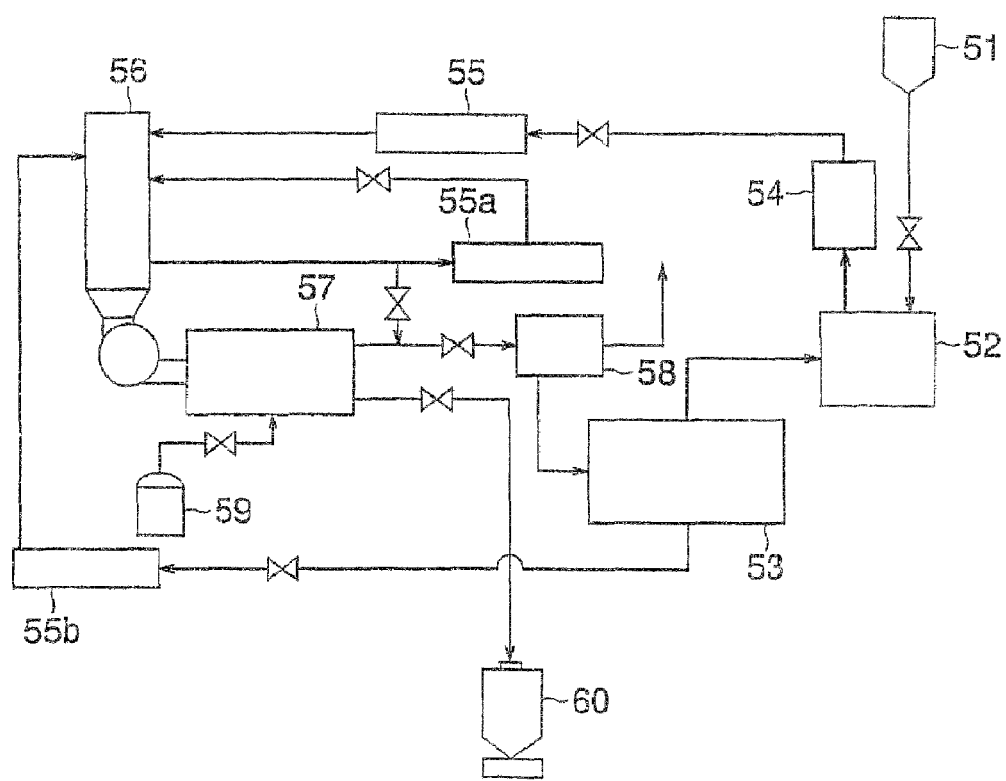
FIG. 5 shows a system flow showing an example of production method of fifth invention.

FIG. 5 shows the flowchart showing an example of production process of the fifth invention.

51 in the figure is the reservoir of metal silicon raw material, and 98.5 to 99% purity metal silicon is kept, and through this, it is sent to reaction tower 52. The reaction silicon produces silicon tetra-chloride with chlorine gas from the electrolysis cell 53 at about 400 C. Silicon tetra-chloride produced is distilled at about 50° C. in the distiller 54 and impurity distilling materials are removed, then heated by heater 55 and sent to the reaction furnace 56, then it is reduced with zinc gas, gasified by heater 55b from molten zinc obtained in the afore said electrolysis cell 53 and then molten silicon is produced. Zinc chloride gas is as atmospheric gas, circulated between the reaction furnace and heater 55a. The reaction furnace temperature is higher than 1350° C. and it is kept by the furnace itself and heating of circulation gas.

Thus liquid silicon drop by reduction of silicon tetra-chloride is collected in the reaction furnace 56 and becomes big drop or particle and is carried to the lower portion to reservoir 57. The reservoir 57 temperature is kept at higher than 1410° C., the melting temperature of silicon, and at reduced pressure by being sent the zinc chloride gas, atmospheric gas of reaction furnace, and also the reaction product gas carried together with silicon to the reservoir, to the cooler 58, so zinc chloride gas possibly contained in the product molten silicon is removed here. And here, gas component can be completely removed by bubbling with argon gas sent from the argon container 59. The zinc chloride gas circulating as the atmospheric gas is increased with the proceeding of the reaction, and the increased portion of it is also carried to the electrolysis cell 53 via cooler 58. Thus the zinc chloride gas produced by the reaction is cooled about at 500° C. and it is sent to the electrolysis cell 53 as liquid. The electrolysis applied is non-diaphragm type one, where chlorine gas is taken out to upper direction and the cathode product zinc is sent to bottom as liquid, and is sent to the reaction furnaces via heater 55b, which were described above. Excess chlorine is required for the chlorination of raw material silicon, it is attained by adding pure zinc chloride into the electrolysis cell from outside and excess produced zinc is exhausted time to time and high purity in the system is kept. Molten silicon kept and de-gasified in the reservoir is sent to the crystal growth vessel 60, and single crystal or poly-crystal high purity silicon is produced from it. By doing this, 6-nine to 9-nine or when by doing CZ single crystal growing, 9-nine to 11-nine purity silicon can be obtained.

Figure 6:
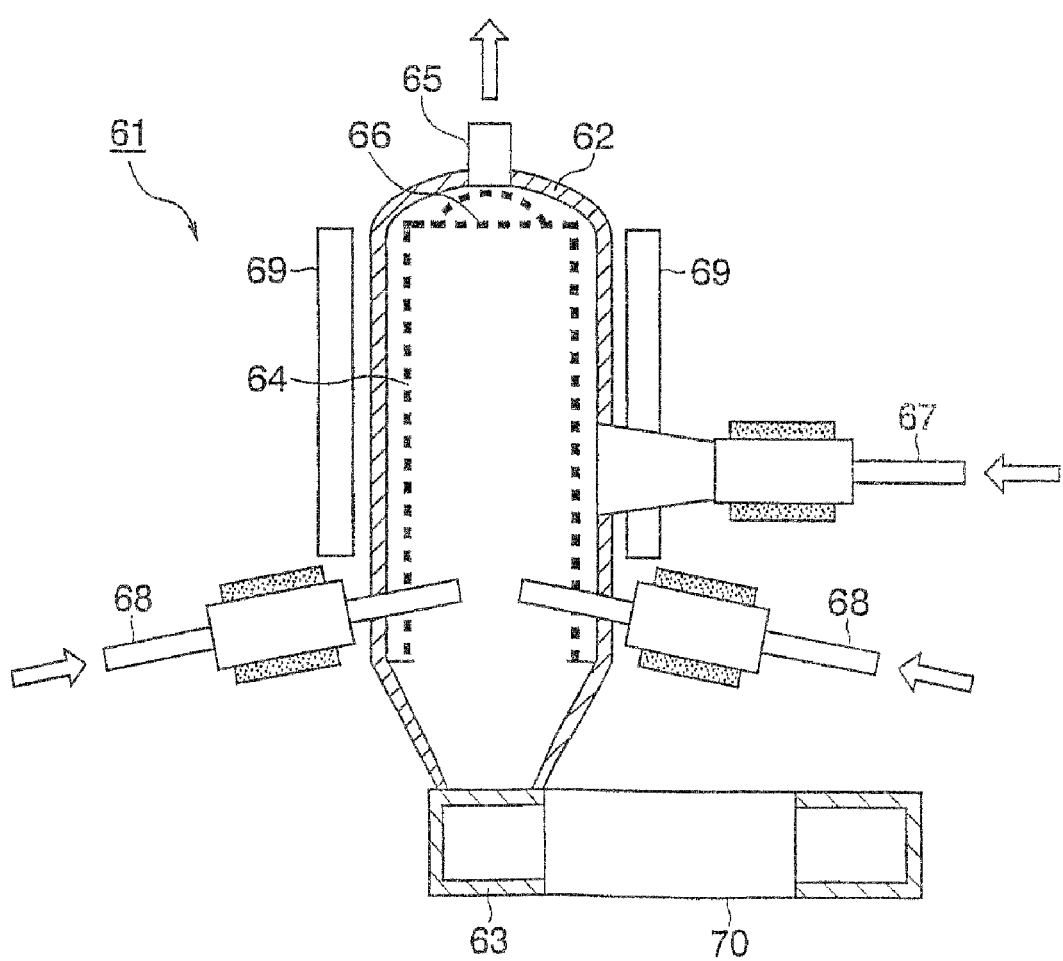
FIG. 6 shows a schematic vertical cross section giving an example of reaction furnace, silicon production system, of sixth invention.

FIG. 6 shows a schematic vertical cross section showing a feature of example of reaction furnace for silicon producing facilities of the sixth invention. And FIG. 7 shows the flowchart showing an example of silicon producing process including said reaction furnace.

As shown in FIG. 6, reaction furnace 61 is constructed with cylindrical shaped furnace portion 62 having quarts glass lining in inner surface, and silicon reservoir 63 situated in the lower portion. The reaction furnace portion 62 has also woven tantalum wire mesh with cylindrical birdcage shaped in it. And the upper portions of the reaction furnace has an exhaust port 65 for atmospheric gas and produced gas, and at the port of it, filter 66 made of sintered tantalum fine wire mesh is attached. Lead wires for electric power are attached both to the filter and the birdcage shaped mesh to enable to heat by electric current. The atmospheric gas flows along the inner surface of the cylindrical reaction furnace in between the quartz glass cylinder and birdcage mesh cylinder 64, and it is exhausted through the exhaust port 65 and made re-circulation. 67 shows the supplying port of the atmospheric gas. And the reaction gases flow is made to be counter flow along just inside of the cylindrical birdcage type mesh directed upper side. 68 shows the reaction gas inlet. The reaction furnace is heated by heater 69 attached outside of the reaction furnace to keep the temperature. The silicon reservoir set beneath the reaction furnace is constructed of quartz glass boat lined its inner surface with tantalum thin film and heated by the heater 70 attached outside of the reservoir.

Figure 7:
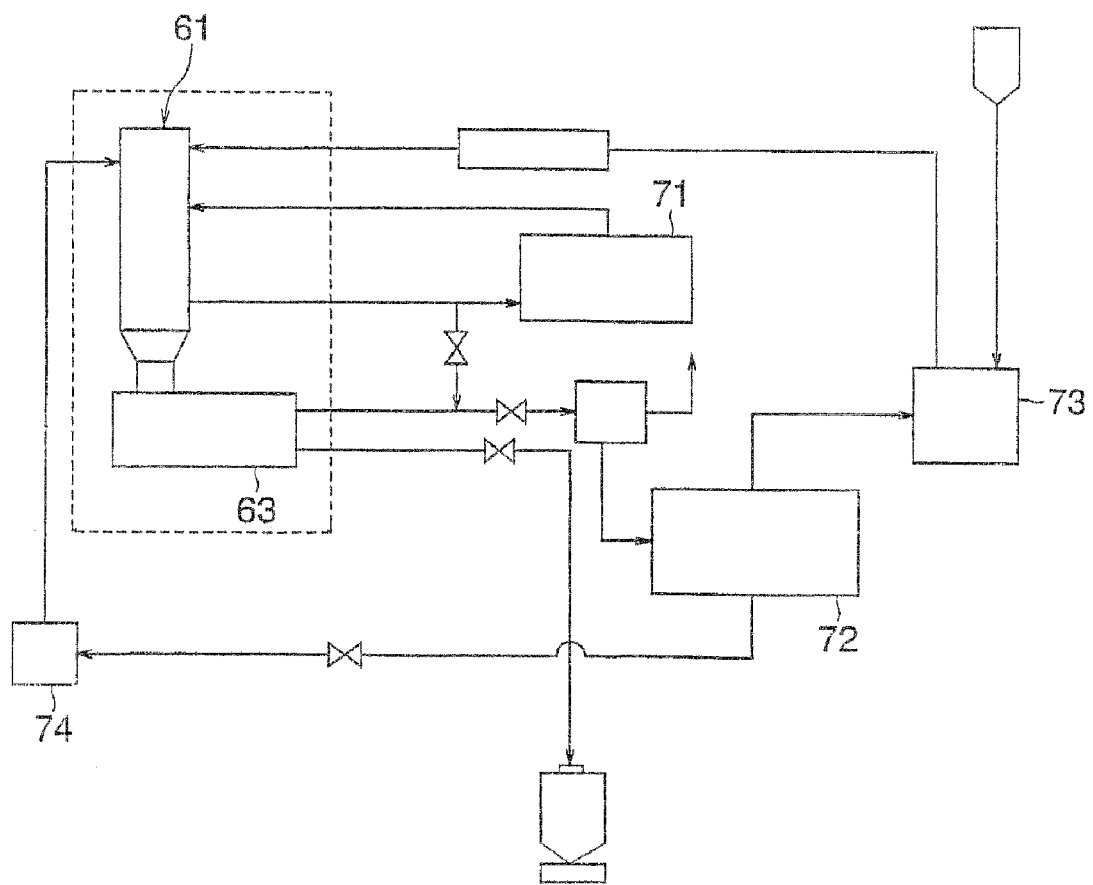
FIG. 7 shows a system flow showing an example of production method of sixth invention.

The reaction furnace 61 in FIG. 6 is attached, for example, into the process of FIG. 7.

The zinc chloride gas of atmospheric gas is circulated in between gas heating apparatus 71 and reaction furnace 61, and a part of gas is taken from this and sent to the electrolysis cell 72, where decomposition to zinc and chlorine gas is carried out. The produced chlorine gas is reacted with silicon in reaction vessel/refining vessel 73, and silicon tetra-chloride after refining is supplied to the reaction furnace 61. Also zinc is heated and gasified at the gas heating facilities 74 and is supplied to reaction furnace 61 and used to the reaction. By doing this, zinc and zinc chloride the sub-raw materials are circulating in the system, and silicon is stored in storing portion (reservoir) 63 of reaction furnace 61. The silicon in this storing portion (reservoir) can be taken out either as poly-silicon or single crystal ingot by sending to the crystal growing facilities 75.

Figure 8:
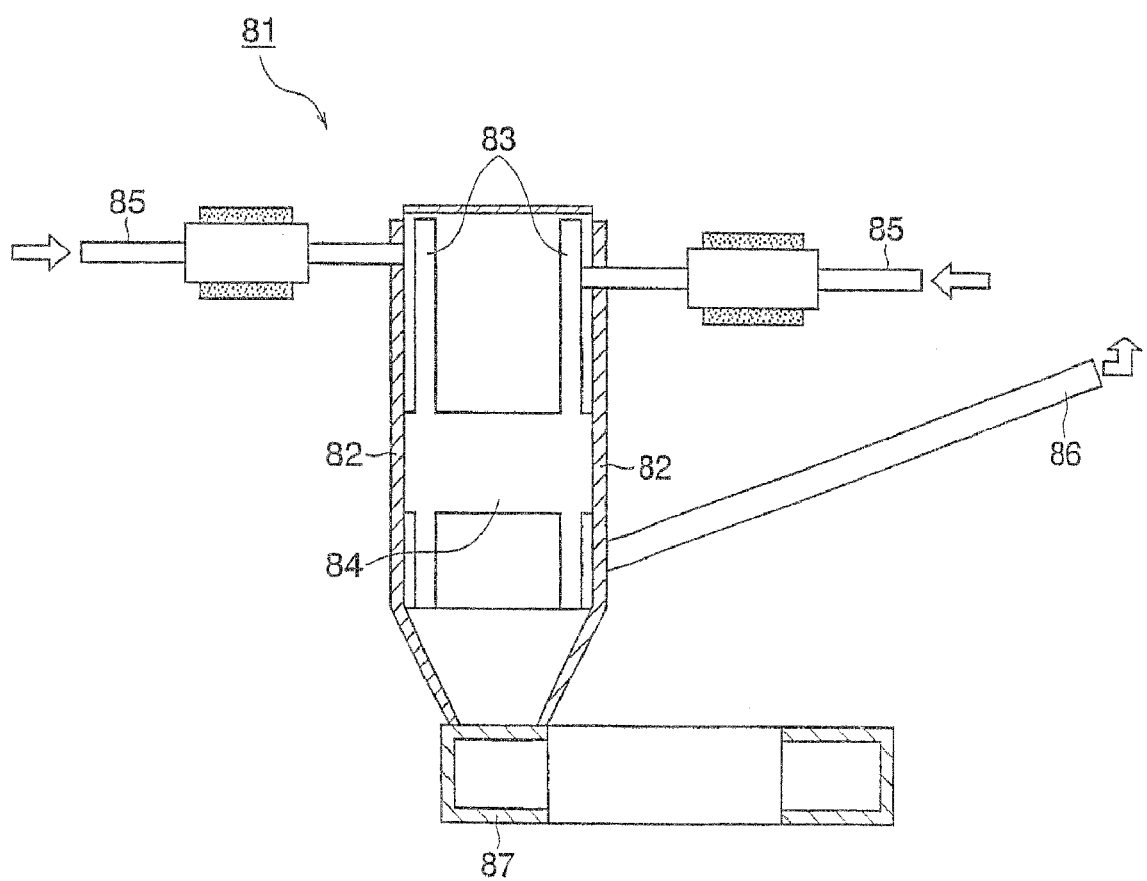
FIG. 8 shows a schematic vertical cross section giving another example of reaction furnace, silicon production system of sixth invention.

FIG. 8 shows a schematic vertical cross section showing another example of the reaction furnace of the silicon producing facilities of the sixth invention.

The outer shape of the reaction furnace 81 is constructed with quartz glass and the power supply 82 for induction heating is set at the outer of it, and inner part of the furnace is covered with cylindrical tantalum plate 83. At the lower portion of the reaction furnace, three dimensional tantalum web made of 0.1 to 0.2 mm diameter of tantalum wire is filled which is also used as the filter.

Reaction gas and the atmospheric gas are taken in from the supply point 85 and produced gas is taken out at exhaust point 86. Pure metal silicon obtained in the reaction furnace is taken out from the lower portion of the reaction furnace 81 and sent to the reservoir 87.

Figure 9:
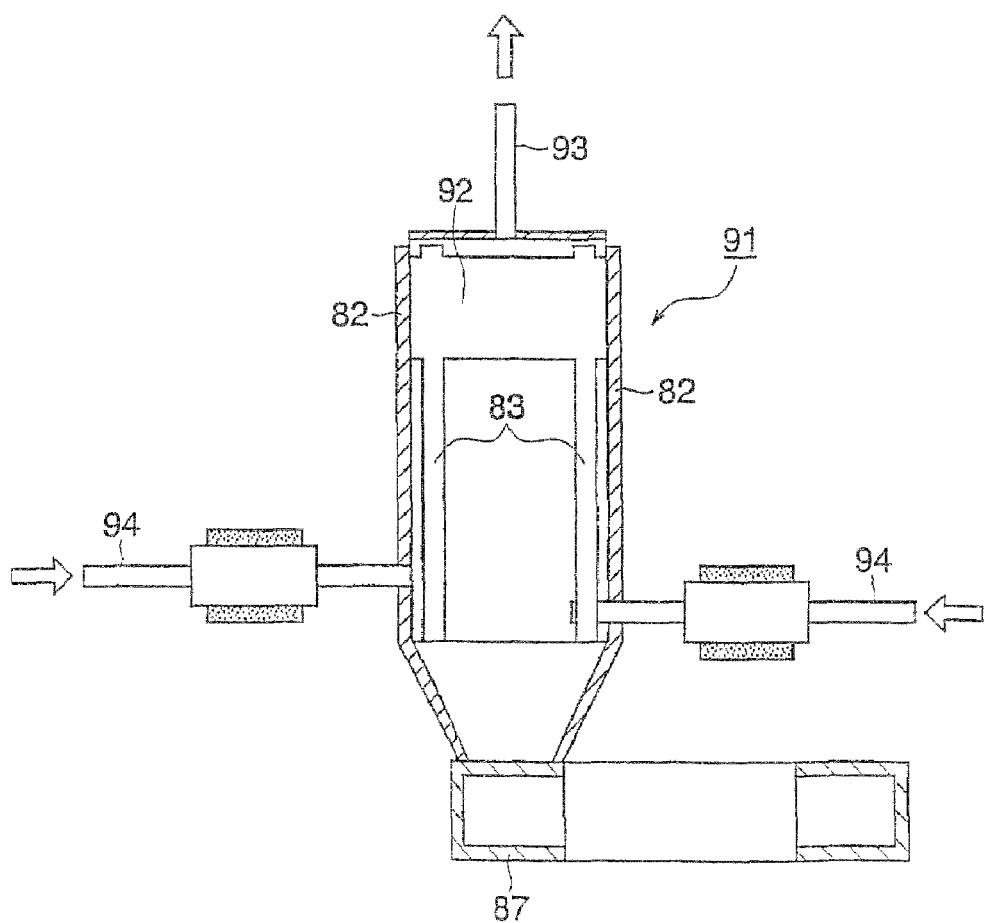
FIG. 9 shows a schematic vertical cross section giving the other example of reaction furnace silicon production system, of sixth invention.

FIG. 9 shows a schematic vertical cross section showing the other example of reaction furnace of silicon producing facilities of the sixth invention.

This reaction furnace is a feature of the improvement of the reaction furnace in FIG. 8, so the explanations of the same portions and same materials as FIG. 8 are omitted and attached the same sign.

This reaction furnace 91 is different from one in FIG. 8 in following portions; tantalum web 92 is situated at the higher portion, produced gas exhaust point 93 is put at the ceiling of the reaction furnace 91, and the supply point 94 of reaction gas and atmospheric gas is set at the lower and side portion of reaction furnace 91.

Examples of the silicon producing method of this invention are explained here in after based on the examples shown as follows, but these examples do not limit this invention

EXAMPLE 1

Silicon producing facilities were constructed with the reaction furnace of FIG. 6 and producing process was constructed as shown in FIG. 7.

Zinc chloride as circulating gas is adjusted to be its temperature of 1100° C. and the pressure of 2 kg/cm2, and it is sent to reaction furnace part, and at the same time, the mixed gas of silicon tetra-chloride and zinc chloride with 1:10 of ratio and mixed gas of zinc and zinc chloride with 1:2 of ratio were supplied to reaction furnace portion. The supply of zinc was made to be 3% more of the required theoretical amount of reaction with silicon tetra-chloride.

After one hour of reaction, zinc chloride gas was substituted with argon gas and tantalum portion in the reaction furnace was heated up to 1450° C. The inner part of the furnace was kept at 1100° C. to 1400° C. The temperature of the storing part (reservoir) is adjusted to be the same as that of reaction furnace. By doing this, silicon deposited on the surface of tantalum filter and tantalum mesh was dissolved and to be liquid drop and deposited as block at the reservoir. Analysis was done to this and clarified to have higher purity than 7-nine and no existence of tantalum was found.

EXAMPLE 2

Using the same facilites as Example 1 except the tantalum portion being changed to molybdenum, Silicon production test was carried out. As no molybdenum mesh was available, same shaped perforated plate with 45% opening was used instead of cylindrical birdcage shaped mesh. By using this, the reaction was carried out at atmospheric gas zinc chloride pressure being 1 atm and the furnace temperature was 1050° C. The supply of zinc was done to be 3% more than the theoretical value. After the reaction, and after the argon gas substitution was over, electric power was given to molybdenum and silicon attached on its surface is moved to the storing portion (reservoir) as the melt then solidified. Analysis was performed to this and resulted to have more than 7-nine and complete no molybdenum was detected, so it is found that higher purity silicon could easily obtained.

EXAMPLE 3

Total process here is being similar to Example 1 with reaction furnace having its structure shown as FIG. 8 was applied in this example.

Zinc chloride gas flow heated at 1200° C. was used as an atmospheric gas and the furnace temperature was kept approximately at 1200° C. Silicon tetra-chloride and zinc gas were supplied to this by similar to Example 1. The zinc chloride gas of atmospheric gas was flown to circulate in the tantalum cylinder along the wall and zinc and silicon tetra-chloride gasses were made to react along with this gas flow. The reaction was ceased after 15 min and de-gas was carried out, then switched on the power source of the induction heating system and raised temperature of porous tantalum plate and web to be 1500° C. By doing this, silicon on tantalum surface was melted then sent down to the storage portion. Thus the silicon obtained with block shaped having its purity being 8-nine. By carrying out of CZ process to this silicon obtained silicon as block had its purity to be 11-nine silicon single crystal was expected to form.

EXAMPLE 4

Total process was made similar to Example 1 but the reaction furnace having its structure as shown in FIG. 9 was applied.

That is metallic part of the reaction furnace portion shown in Example 3 was changed to molybdenum wall for inner wall was set and the web put in the furnace is set at upper portion and the atmospheric gas zinc chloride and reaction gasses silicon tetrachloride and zinc were lead and taken into from the lower portion, and the gases were exhausted from the upper side. Silicon reservoir was set just below the furnace. The inner wall of the reservoir was made to be tantalum. By using this furnace, the atmospheric gas was lead into it having the temperature being 1300° C. and the reaction gasses were also sent to it as mixed gas with zinc chloride both for silicon tetra-chloride and zinc shown as Example 1. The temperature of reaction gasses was 1000° C. for silicon tetrachloride containing gas and 1300° C. for zinc containing, and the reaction temperature was actually 1300° C. By doing this, silicon was deposited on the web portion of molybdenum. After 15 min, the supply of reaction gases was stopped and ceased their reaction then sent 1300° C. argon gas into it to make gas substitution to attain exhausting the atmospheric gas, then silicon was made to be melt by raising the temperature of web and wall by induction heating up to 1500° C. Molten silicon was filled in the reservoir situated below. The reservoir temperature was kept at 1400° C. and after while, the gradual solidification was started. After 2 hours of cooling, produced silicon was taken out and found to be block and very compact. The analysis results gave more than 8-nine purity with no trace of tantalum or molybdenum.

Since the above embodiments are described only for examples, the present invention is not limited to the above embodiments and various modifications or alterations can be easily made therefrom by those skilled in the art without departing from the scope of the present invention.

The invention claimed is:

1. A method of producing high purity silicon using silicon tetra-chloride as raw material comprising the steps of:
   1) performing a gas phase reaction between silicon tetra-chloride and metal zinc in zinc chloride gas in a reaction furnace;
   2) separating produced metal silicon in a liquid state from gas;
   3) separating a part of the zinc chloride gas which is cooled and liquefied;
   4) electrolyzing the liquid zinc chloride to produce chlorine gas and molten zinc;
   5) vaporizing the produced molten zinc by heating which is sent to the reaction furnace;
   6) reacting the chlorine gas produced by the electrolysis with coarse silicon to generate coarse silicon tetra-chloride;
   7) purifying the coarse silicon tetra-chloride by means of distillation; and
   8) vaporizing the purified silicon tetra-chloride which is sent to the reaction furnace.

2. The method of producing the high purity silicon as claimed in claim 1 characterized by further comprising a step of eliminating the reaction gas contained in the metal silicon between the steps 2) and 3)

3. The method of producing the high purity silicon as claimed in claim 1 characterized in that the reaction furnace is a cyclone melting furnace in which reaction gasses are circulated by atmospheric gas circulating therein for performing the reaction, thereby minimizing contact with a side wall of the reaction furnace.

4. The method of producing the high purity silicon as claimed in claim 1 characterized in that reaction temperature is 1300° C. or more, and the silicon produced in the reaction goes downward as fine particle and/or liquid drop to be held in a silicon melt reservoir placed below the reaction furnace.

5. The method of producing the high purity silicon as claimed in claim 1 characterized in that the gas component in the produced silicon melt is eliminated by passing argon gas through the silicon melt.

6. The method of producing the high purity silicon as claimed in claim 1 characterized in that the electrolysis of the zinc chloride is conducted without support electrolyte.

7. The method of producing the high purity silicon as claimed in claim 1 characterized in that the chlorine gas generated by the electrolysis of the zinc chloride is taken out from an upper part of the electrolytic cell and the molten zinc from a bottom part.

8. The method of producing the high purity silicon as claimed in claim 1 characterized in that the chlorine gas generated by the electrolysis is in contact with raw material metal silicon at the higher temperature to be converted into coarse silicon tetra-chloride which is liquefied and stored at ordinary temperature and then purified with distillation for use as raw material silicon tetra-chloride so that the generated chlorine is not required to be stored as gas or liquid.

* * * * *